US012179557B2

(12) United States Patent
Moriya et al.

(10) Patent No.: US 12,179,557 B2
(45) Date of Patent: Dec. 31, 2024

(54) VEHICLE AIR-CONDITIONING DEVICE

(71) Applicant: SANDEN AUTOMOTIVE CLIMATE SYSTEMS CORPORATION, Isesaki (JP)

(72) Inventors: Kentaro Moriya, Isesaki (JP); Tetsuya Ishizeki, Isesaki (JP); Takefumi Tomiya, Isesaki (JP); Takayuki Matsumura, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 376 days.

(21) Appl. No.: 17/620,476

(22) PCT Filed: Aug. 21, 2020

(86) PCT No.: PCT/JP2020/031570
§ 371 (c)(1),
(2) Date: Dec. 17, 2021

(87) PCT Pub. No.: WO2021/054041
PCT Pub. Date: Mar. 25, 2021

(65) Prior Publication Data
US 2022/0250439 A1    Aug. 11, 2022

(30) Foreign Application Priority Data

Sep. 18, 2019  (JP) .................... 2019-169463

(51) Int. Cl.
*B60H 1/00*    (2006.01)
*B60H 1/22*    (2006.01)

(52) U.S. Cl.
CPC ..... *B60H 1/00921* (2013.01); *B60H 1/00278* (2013.01); *B60H 1/22* (2013.01);
(Continued)

(58) Field of Classification Search
CPC .. B60H 1/00921; B60H 1/00278; B60H 1/22; B60H 2001/00307; B60H 2001/00961
See application file for complete search history.

(56) References Cited

U.S. PATENT DOCUMENTS

2009/0133417 A1*  5/2009  Egawa ............... B60H 1/00742
62/132
2013/0291577 A1   11/2013  Miyakoshi et al.
(Continued)

FOREIGN PATENT DOCUMENTS

DE    11 2012 000 522 T5    10/2013
JP         2001-063347 A      3/2001
(Continued)

OTHER PUBLICATIONS

Japan Patent Office, International Search Report issued in International Application No. PCT/JP2020/031570, mailed Nov. 2, 2020.
(Continued)

*Primary Examiner* — Marc E Norman
(74) *Attorney, Agent, or Firm* — Baker Botts L.L.P.

(57) ABSTRACT

There is provided a vehicle air-conditioning device capable of smoothly achieving pre-air-conditioning for preliminarily heating a vehicle interior without forming frost on an outdoor heat exchanger or while preventing frost formation thereon as much as possible. When the temperature of a battery 55 or a motor 65 for running is higher than or equal to a predetermined specified value upon executing the pre-air-conditioning for preliminarily heating the vehicle interior before boarding, a controller 32 operates a compressor 2 to let a refrigerant discharged from the compressor radiate heat in a radiator 4, decompress the refrigerant from which the heat is radiated, and then let the refrigerant absorb heat in a waste heat recovering heat exchanger 64 without using an outdoor heat exchanger 7.

14 Claims, 13 Drawing Sheets

(52) U.S. Cl.
CPC .............. *B60H 2001/00307* (2013.01); *B60H 2001/00961* (2019.05)

(56) References Cited

U.S. PATENT DOCUMENTS

| | | | | |
|---|---|---|---|---|
| 2014/0041826 | A1* | 2/2014 | Takeuchi | B60L 1/08 165/10 |
| 2020/0171919 | A1 | 6/2020 | Ishizeki et al. | |
| 2020/0276878 | A1* | 9/2020 | Zhang | B60H 1/00985 |
| 2020/0346520 | A1* | 11/2020 | Ishizeki | B60H 1/00328 |
| 2020/0353793 | A1* | 11/2020 | Choi | F25B 25/005 |
| 2021/0102716 | A1* | 4/2021 | Ito | F24F 1/022 |
| 2021/0300146 | A1* | 9/2021 | Ishizeki | B60H 1/00278 |
| 2021/0309070 | A1* | 10/2021 | Ishizeki | B60H 1/00921 |
| 2021/0323380 | A1* | 10/2021 | Ishizeki | B60H 1/00921 |
| 2022/0072927 | A1* | 3/2022 | Wang | B60H 1/00921 |
| 2022/0258570 | A1* | 8/2022 | Ishizeki | B60H 1/00385 |
| 2022/0305883 | A1* | 9/2022 | Ishizeki | F25B 5/02 |
| 2022/0363110 | A1* | 11/2022 | Ishizeki | F25B 41/20 |
| 2023/0391160 | A1* | 12/2023 | Wang | B60H 1/00278 |

FOREIGN PATENT DOCUMENTS

| | | |
|---|---|---|
| JP | 2001-083347 A | 3/2001 |
| JP | 2013-180723 A | 9/2013 |
| JP | 2014-226962 A | 12/2014 |
| JP | 2014-226979 A | 12/2014 |
| JP | 2019-038352 A | 3/2019 |
| WO | 2019/021710 A1 | 1/2019 |

OTHER PUBLICATIONS

Intellectual Property Office of the People's Republic of China, First Examination Opinion Notice issued in Chinese Patent Application No. 202080044584.6, issued Nov. 1, 2023 (14 pages).

German Patent and Trade Mark Office, First Office Action issued in German Patent Application No. 11 2020 004 423.8, dated May 30, 2023 (16 pages).

* cited by examiner

VEHICLE AIR-CONDITIONING DEVICE

CROSS-REFERENCE TO RELATED APPLICATIONS

This application is a U.S. National Stage Patent Application under 37 U.S.C. § 371 of International Patent Application No. PCT/JP2020/031570, filed on Aug. 21, 2020, which claims the benefit of Japanese Patent Application No. JP 2019-169463, filed on Sep. 18, 2019, the disclosures of each of which are incorporated herein by reference in their entirety.

TECHNICAL FIELD

The present invention relates to a vehicle air-conditioning device of a heat pump type, and particularly to an air-conditioning device of a vehicle capable of executing pre-air-conditioning for preliminarily heating a vehicle interior before a vehicle is boarded.

BACKGROUND ART

Due to actualization of environmental problems in recent years, vehicles such as hybrid cars, electric vehicles each of which drives a motor for running by power supplied from a battery mounted on the vehicle have spread. Further, as an air conditioning device which is applicable to such a vehicle, there has been developed a heat pump type vehicle air-conditioning device which includes a refrigerant circuit to which a compressor driven by power supply from a battery, a radiator, a heat absorber, and an outdoor heat exchanger are connected, and which lets a refrigerant discharged from the compressor radiate heat in the radiator and lets the refrigerant from which the heat has been radiated in the radiator absorb heat in the outdoor heat exchanger to heat an vehicle interior, and which lets the refrigerant discharged from the compressor radiate heat in the outdoor heat exchanger and lets the refrigerant absorb heat in the heat absorber to cool the vehicle interior.

In this case, while the battery is being charged by connecting an external power source such as a quick charger to the battery, the compressor is driven by the power supply from the external power source, and the outdoor heat exchanger has been prevented from frost formation by heating the vehicle interior without circulating the refrigerant in the outdoor heat exchanger (refer to, for example, Patent Document 1).

Further, there has also been developed one in which a heat generating device such as a battery mounted on a vehicle is cooled, and waste heat is recovered from the heat generating device to heat a vehicle interior (refer to, for example, Patent Document 2). This also enables frost formation on an outdoor heat exchanger to be reduced.

In addition, there has also been developed one in which it is possible to perform pre-air-conditioning to preliminarily air-condition the interior of a vehicle before its boarding. In that case, there has also been developed an air conditioning device which is driven by an external power source (refer to, for example, Patent Document 3).

CITATION LIST

Patent Documents

Patent Document 1: Japanese Patent Application Laid-Open No. 2014-226979

Patent Document 2: Japanese Patent Application Laid-Open No. 2019-38352

Patent Document 3: Japanese Patent Application Laid-Open No. 2001-63347

SUMMARY OF THE INVENTION

Problems to be Solved by the Invention

Thus, there has been developed the one in which the waste heat is recovered from the heat generating device to heat the vehicle interior, and there has also been developed the one in which the pre-air-conditioning in the vehicle interior can be executed before boarding. However, there has not been developed a concrete measure that smoothly recovers the waste heat from the heat generating device in the pre-air-conditioning and makes it possible to effectively eliminate or suppress the frost formation on the outdoor heat exchanger by using the waste heat, and a solution for that has been desired.

The present invention has been made to solve such conventional technical problems and aims to provide a vehicle air-conditioning device capable of smoothly achieving pre-air-conditioning for preliminarily heating a vehicle interior without using an outdoor heat exchanger or using the same as much as possible.

Means for Solving the Problems

A vehicle-air conditioning device of the present invention includes a compressor to compress a refrigerant, a radiator to let the refrigerant radiate heat, thereby heating air to be supplied to a vehicle interior, an outdoor heat exchanger provided outside the vehicle interior, a waste heat recovering heat exchanger to recover waste heat from a heat generating device mounted on a vehicle by using the refrigerant, and a control device, and is characterized in that the control device at least lets the refrigerant discharged from the compressor radiate heat in the radiator, decompresses the refrigerant from which the heat has been radiated, and then lets the refrigerant absorb heat in the outdoor heat exchanger to heat the vehicle interior, and the control device is capable of executing pre-air-conditioning for preliminarily heating the vehicle interior before boarding, and in that when the temperature of the heat generating device is higher than or equal to a predetermined specified value in the case where the pre-air-conditioning is executed, the control device operates the compressor to let the refrigerant discharged from the compressor radiate heat in the radiator, decompress the refrigerant from which the heat has been radiated, and then let the refrigerant absorb heat in the waste heat recovering heat exchanger without using the outdoor heat exchanger, thereby heating the vehicle interior.

The vehicle air-conditioning device of the invention of claim 2 includes an auxiliary heater to heat the air supplied to the vehicle interior in the above invention, and is characterized in that when a heating capacity by the radiator is insufficient in the case where the control device executes the pre-air-conditioning in a state in which the vehicle is connected to an external power source, the control device causes the auxiliary heater to generate heat without operating the compressor, thereby heating the vehicle interior.

The vehicle air-conditioning device of the invention of claim 3 includes an auxiliary heater to heat the air supplied to the vehicle interior in the above respective inventions, and is characterized in that when the temperature of the heat generating device is lower than the specified value in the case where the control device executes the pre-air-conditioning in the state in which the vehicle is connected to the external power source, the control device causes the auxiliary heater to generate heat without operating the compressor, thereby heating the vehicle interior.

The vehicle air-conditioning device of the invention of claim 4 includes an auxiliary heater to heat the air supplied to the vehicle interior in the above respective inventions, and is characterized in that when the heating capacity by the radiator is insufficient in the case where the control device executes the pre-air-conditioning in the state in which the vehicle is not connected to the external power source, the control device decompresses the refrigerant from which the heat has been radiated in the radiator and then lets the refrigerant absorb heat in the waste heat recovering heat exchanger, and causes the auxiliary heater to generate heat, thereby heating the vehicle interior.

The vehicle air-conditioning device of the invention of claim 5 is characterized in that in the inventions of claims 1 to 3, when the heating capacity by the radiator is insufficient in the case where the control device executes the pre-air-conditioning in the state in which the vehicle is not connected to the external power source, the control device decompresses the refrigerant from which the heat has been radiated in the radiator and then lets the refrigerant absorb heat in the outdoor heat exchanger and the waste heat recovering heat exchanger, thereby heating the vehicle interior.

The vehicle air-conditioning device of the invention of claim 6 is characterized in that in the above respective inventions, when the temperature of the heat generating device is lower than the specified value in the case where the control device executes the pre-air-conditioning in the state in which the vehicle is not connected to the external power source, the control device decompresses the refrigerant from which the heat has been radiated in the radiator, and then lets the refrigerant absorb heat in the outdoor heat exchanger, thereby heating the vehicle interior.

The vehicle air-conditioning device of the invention of claim 7 is characterized in that in the invention of claim 5 or 6, the control device performs heating of the vehicle interior in a range in which the outdoor heat exchanger is not frosted.

The vehicle air-conditioning device of the invention of claim 8 is characterized in that in the above respective inventions, the heat generating device includes at least a battery which can be charged by the external power source, and is operated by being supplied with power from the battery.

The vehicle air-conditioning device of the invention of claim 9 includes an air inlet changing damper to change the air supplied to the vehicle interior between indoor air circulating and outdoor air introducing in the above respective inventions, and is characterized in that when the pre-air-conditioning is executed, the control device changes the air inlet changing damper to the indoor air circulating.

Advantageous Effect of the Invention

According to the present invention, in a vehicle-air conditioning device including a compressor to compress a refrigerant, a radiator to let the refrigerant radiate heat, thereby heating air to be supplied to a vehicle interior, an outdoor heat exchanger provided outside the vehicle interior, a waste heat recovering heat exchanger to recover waste heat from a heat generating device mounted on a vehicle by using the refrigerant, and a control device, and in which the control device at least lets the refrigerant discharged from the compressor radiate heat in the radiator, decompresses the refrigerant from which the heat has been radiated, and then lets the refrigerant absorb heat in the outdoor heat exchanger to heat the vehicle interior, the control device is capable of executing pre-air-conditioning for preliminarily heating the vehicle interior before boarding. When the temperature of the heat generating device is higher than or equal to a predetermined specified value in the case where the pre-air-conditioning is executed, the control device operates the compressor to let the refrigerant discharged from the compressor radiate heat in the radiator, decompress the refrigerant from which the heat has been radiated, and then let the refrigerant absorb heat in the waste heat recovering heat exchanger without using the outdoor heat exchanger, thereby heating the vehicle interior. Therefore, it becomes possible to heat the vehicle interior before boarding by effectively utilizing the waste heat of the heat generating device which generates heat until the temperature becomes higher than or equal to the specified value, and to effectively pre-air condition the vehicle interior without causing frost to form on the outdoor heat exchanger.

Consequently, it becomes possible to reduce the load when executing heating in which the outdoor heat exchanger absorbs heat from outdoor air during running or the like after boarding is reduced, suppress frost formation on the outdoor heat exchanger especially under a low outdoor air temperature environment, and extend a period during which the heating can be performed with high efficiency.

In particular, as in the invention of claim 8, in the case of the vehicle air-conditioning device in which the heat generating device includes a battery which can be charged by an external power source, and is operated by being supplied with power from the battery, it becomes also possible to prevent in advance the inconvenience that the temperature of the battery drops too much so that the battery is deteriorated, thereby reducing its charge/discharge efficiency.

Here, in the vehicle air-conditioning device including an auxiliary heater to heat the air supplied to the vehicle interior, when a heating capacity by the radiator is insufficient in the case where the control device executes the pre-air-conditioning in a state in which the vehicle is connected to the external power source, the control device causes the auxiliary heater to generate heat without operating the compressor, thereby heating the vehicle interior as in the invention of claim 2. Consequently, when the heating capacity in the vehicle interior cannot be achieved by recovering the waste heat from the heat generating device, the auxiliary heater is caused to generate heat to thereby enable the vehicle interior to be heated. In this case, since the external power source is connected to the vehicle and there is no need to worry about the battery being exhausted due to the power consumption of the auxiliary heater, effective vehicle interior heating by pre-air-conditioning can be achieved.

Further, similarly, in the vehicle air-conditioning device including an auxiliary heater to heat the air supplied to the vehicle interior, when the temperature of the heat generating device is lower than the specified value in the case where the control device executes the pre-air-conditioning in the state in which the vehicle is connected to the external power source, the control device causes the auxiliary heater to generate heat without operating the compressor, thereby heating the vehicle interior as in the invention of claim 3. Consequently, when the recovery of the waste heat from the heat generating device cannot be expected, the compressor is stopped, and the vehicle interior can be heated by the auxiliary heater. In this case as well, since the external power source is connected to the vehicle and there is no need to worry about the battery being exhausted due to the power consumption of the auxiliary heater, it is possible to achieve effective vehicle interior heating by pre-air-conditioning in like manner.

Meanwhile, in the vehicle air-conditioning device including an auxiliary heater to heat the air supplied to the vehicle interior, when the heating capacity by the radiator is insufficient in the case where the pre-air-conditioning is executed in the state in which the vehicle is not connected to the external power source, as in the invention of claim 4, the control device decompresses the refrigerant from which the heat has been radiated in the radiator and then lets the refrigerant absorb heat in the waste heat recovering heat exchanger, and causes the auxiliary heater to generate heat, thereby heating the vehicle interior. Consequently, when the heating capacity in the vehicle interior is insufficient only with the waste heat from the heat generating device, the auxiliary heater is caused to generate heat to thereby make it possible to make up for the shortage. Thus, it becomes possible to eliminate frost formation on the outdoor heat exchanger and achieve effective vehicle interior heating by the pre-air-conditioning while minimizing the power consumption of the auxiliary heater.

On the other hand, as in the invention of claim 5, when the heating capacity by the radiator is insufficient in the case where the control device executes the pre-air-conditioning in the state in which the vehicle is not connected to the external power source, the control device decompresses the refrigerant from which the heat has been radiated in the radiator and then lets the refrigerant absorb heat in the outdoor heat exchanger and the waste heat recovering heat exchanger, thereby heating the vehicle interior. Consequently, the effective vehicle interior heating by the pre-air-conditioning can be achieved while utilizing the waste heat of the heat generating device and preventing the outdoor heat exchanger from being frosted as much as possible. This can also be applied to a vehicle air-conditioning device having no auxiliary heater and is highly convenient.

Incidentally, when the temperature of the heat generating device is lower than the specified value in the case where the pre-air-conditioning is executed in the state in which the vehicle is not connected to the external power source, as in the invention of claim 6, the control device decompresses the refrigerant from which the heat has been radiated in the radiator, and then lets the refrigerant absorb heat in the outdoor heat exchanger, thereby heating the vehicle interior, but as in the invention of claim 7, the control device performs heating of the vehicle interior in a range in which the outdoor heat exchanger is not frosted. As a result, although the heating capacity in the vehicle interior by the pre-air-conditioning in the invention of claim 5 or 6 is lowered, it becomes possible to eliminate frost formation on the outdoor heat exchanger or reduce it as much as possible. With this, it becomes possible to extend a period in which heating can be performed with high efficiency during running or the like after boarding.

Further, as in the invention of claim 9, an air inlet changing damper to change the air supplied to the vehicle interior between indoor air circulating and outdoor air introducing is provided, and the control device changes the air inlet changing damper to the indoor air circulating in the case where the pre-air-conditioning is executed. As a result, it becomes possible to efficiently perform heating of the vehicle interior without introducing the outdoor air low in temperature into the vehicle interior during the pre-air-conditioning.

MODE FOR CARRYING OUT THE INVENTION

Figure 1:
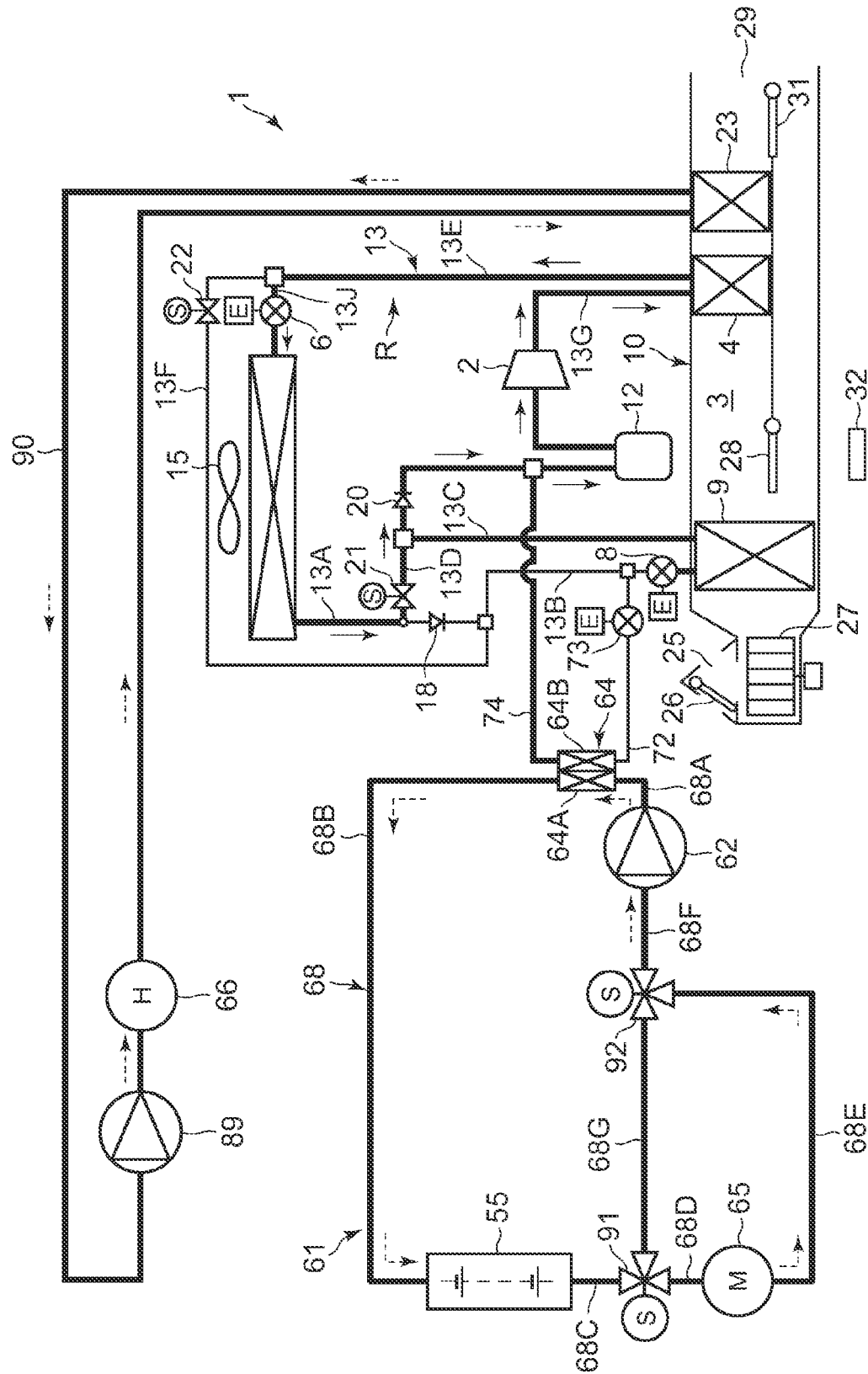
FIG. 1 is a constitutional diagram of a vehicle air-conditioning device of an embodiment to which the present invention is applied (outdoor heat exchanger frosting suppression heating mode of heating operation in heating operation, pre-air-conditioning)

Hereinafter, embodiments of the present invention will be described in detail based on the drawings. FIG. 1 illustrates a constitutional diagram of a vehicle air-conditioning device 1 of an embodiment to which the present invention is applied. A vehicle of the embodiment to which the present invention is applied is an electric vehicle (EV) in which an engine (an internal combustion engine) is not mounted, and is mounted with a battery 55 (e.g., a lithium battery) and runs with a motor 65 for running which is driven by being supplied with power charged in the battery 55 from an external power source (a quick charger or the like). Then, a compressor 2 and other devices to be described later in the vehicle air-conditioning device 1 are also driven by being supplied with power from the battery 55.

That is, in the electric vehicle which is not capable of performing heating by engine waste heat, the vehicle air-conditioning device 1 performs a heating operation by a heat pump operation in which a refrigerant circuit R is used. Further, the vehicle air-conditioning device 1 selectively executes respective air conditioning operations of a dehumidifying and heating operation, a dehumidifying and cooling operation, and a cooling operation to perform air conditioning of a vehicle interior.

Incidentally, the vehicle is not limited to such an electric vehicle. It is needless to say that the present invention is also effective for a vehicle which is a so-called hybrid car in which an engine is used together with an electric motor for running, and in which a battery can be charged from an external power source.

The vehicle air-conditioning device 1 of the embodiment performs air conditioning (heating, cooling, dehumidifying, and ventilation) of the vehicle interior of the electric vehicle. The electric type of compressor (electric compressor) 2 to compress a refrigerant, a radiator 4 which is provided in an air flow passage 3 of an HVAC unit 10 in which air in the vehicle interior is ventilated and circulated, to let the high-temperature high-pressure refrigerant discharged from the compressor 2 flow therein via a refrigerant pipe 13G and to let the refrigerant radiate heat to heat the air supplied to the vehicle interior, an outdoor expansion valve 6 constituted of an electric valve which decompresses and expands the refrigerant during the heating, an outdoor heat exchanger 7 for causing the refrigerant to perform heat exchange with outdoor air to function as a radiator (condenser) to let the refrigerant radiate heat during the cooling and to function as an evaporator to let the refrigerant absorb heat during the heating, an indoor expansion valve 8 constituted of an electric valve to decompress and expand the refrigerant, a heat absorber 9 provided in the air flow passage 3 to let the refrigerant absorb heat from the interior and exterior of the vehicle during the cooling (during dehumidifying), thereby cooling the air supplied to the vehicle interior, an accumulator 12, and others are successively connected by a refrigerant pipe 13, whereby the refrigerant circuit R is constituted. Incidentally, the outdoor expansion valve 6 and the indoor expansion valve 8 decompress and expand the refrigerant and can also be fully opened and closed.

Incidentally, the outdoor heat exchanger 7 is provided with an outdoor blower 15. The outdoor blower 15 forcibly passes the outdoor air through the outdoor heat exchanger 7 to thereby perform heat exchange between the outdoor air and the refrigerant, whereby the outdoor air is made to pass through the outdoor heat exchanger 7 even during stopping of the vehicle (i.e., its velocity is 0 km/h).

Also, a refrigerant pipe 13A connected to the refrigerant outlet side of the outdoor heat exchanger 7 is connected to a refrigerant pipe 13B through a check valve 18. Incidentally, the check valve 18 is configured such that the refrigerant pipe 13B side serves as a forward direction. The refrigerant pipe 13B is connected to the indoor expansion valve 8.

Further, the refrigerant pipe 13A extending out from the outdoor heat exchanger 7 branches and this branching refrigerant pipe 13D communicates and connects with a refrigerant pipe 13C located on an outlet side of the heat absorber 9 via a solenoid valve 21 to be opened during the heating. Then, a check valve 20 is connected to the refrigerant pipe 13C on a downstream side from a connecting point of the refrigerant pipe 13D. The refrigerant pipe 13C on a downstream side from the check valve 20 is connected to the accumulator 12. The accumulator 12 is connected to a refrigerant suction side of the compressor 2. Incidentally, the check valve 20 has an accumulator 12 side which serves as a forward direction.

Furthermore, a refrigerant pipe 13E on an outlet side of the radiator 4 branches to a refrigerant pipe 13J and a refrigerant pipe 13F in front of the outdoor expansion valve 6 (on a refrigerant upstream side). One branching refrigerant pipe 13J is connected to a refrigerant inlet side of the outdoor heat exchanger 7 via the outdoor expansion valve 6. In addition, the other branching refrigerant pipe 13F communicates and connects with the refrigerant pipe 13B located on a refrigerant downstream side of the check valve 18 via a solenoid valve 22 to be opened during the dehumidifying and on a refrigerant upstream side of the indoor expansion valve 8.

Consequently, the refrigerant pipe 13F is connected in parallel with a series circuit of the outdoor expansion valve 6, the outdoor heat exchanger 7, and the check valve 18. The refrigerant pipe 13F becomes a circuit which bypasses the outdoor expansion valve 6, the outdoor heat exchanger 7, and the check valve 18.

Also, in the air flow passage 3 on an air upstream side of the heat absorber 9, respective suction ports such as an outdoor air suction port and an indoor air suction port are formed (represented by a suction port 25 in FIG. 1), and in the suction port 25, an air inlet changing damper 26 is provided to change the air to be introduced into the air flow passage 3 to indoor air which is air of the vehicle interior (indoor air circulating) and outdoor air which is air outside the vehicle interior (outdoor air introducing). Further, an indoor blower (a blower fan) 27 to supply the introduced indoor or outdoor air to the air flow passage 3 is provided on an air downstream side of the air inlet changing damper 26.

Further, in FIG. 1, 23 is a heater core, 89 is a first circulation pump, and 66 is an auxiliary heater composed of a PTC heater (electric heater) for heating the air supplied to the vehicle interior. These are sequentially connected in a loop by a heat medium pipe 90. The heater core 23 is provided in the air flow passage 3 which serves as an air downstream side of the radiator 4 with respect to the flow of the air in the air flow passage 3. When the first circulation pump 89 is operated, and the auxiliary heater 66 is energized to generate heat, a heat medium (e.g., water) heated with the auxiliary heater 66 is circulated through the heater core 23 to heat the air in the air flow passage 3 supplied to the vehicle interior through the radiator 4.

Additionally, in the air flow passage 3 on an air upstream side of the radiator 4, there is provided an air mix damper 28 to adjust a ratio at which the air in the air flow passage 3 (the indoor or outdoor air) flowing into the air flow passage 3 and passed through the heat absorber 9 is to be passed through the radiator 4 and the heater core 23. Further, in the air flow passage 3 on the air downstream side of the radiator 4, there is formed each air outlet (represented by an air outlet 29 in FIG. 1) of FOOT (foot), VENT (vent) or DEF (defroster). In the air outlet 29, there is provided an air outlet changing damper 31 to execute changing control of blowing of the air from each air outlet mentioned above.

In addition, the vehicle air-conditioning device 1 is provided with a waste heat recovering device 61 which circulates a heat medium through the battery 55 and the motor 65 for running each used as a heat generating device mounted on the vehicle to recover waste heat from the battery 55 and the motor 65 for running to thereby adjust their temperatures.

Incidentally, the heat generating device mounted on the vehicle in the present invention is not limited to the battery 55 and the motor 65 for running and also includes an electrical device such as an inverter circuit for driving the motor 65 for running. In the embodiment, the heat generating device will be described by taking the battery 55 and the motor 65 for running by way of example.

The waste heat recovering device 61 of the embodiment includes a second circulation pump 62 as a circulation device to circulate the heat medium through the battery 55 and the motor 65 for running, a waste heat recovering heat exchanger 64, a first three-way valve 91, and a second three-way valve 92. Those and the battery 55 and the motor 65 for running are connected by a heat medium pipe 68.

In the case of the embodiment, the discharge side of the second circulation pump 62 is connected to an inlet of a heat medium flow passage 64A of the waste heat recovering heat exchanger 64 through a heat medium pipe 68A. An outlet of the heat medium flow passage 64A is connected to an inlet of the battery 55 through a heat medium pipe 68B, and an outlet of the battery 55 is connected to an inlet of the first three-way valve 91 through a heat medium pipe 68C.

One outlet of the first three-way valve 91 is connected to an inlet of the motor 65 for running through a heat medium pipe 68D. An outlet of the motor 65 for running is connected to one inlet of the second three-way valve 92 through a heat medium pipe 68E. Then, an outlet of the second three-way valve 92 is connected to the suction side of the second circulation pump 62 through a heat medium pipe 68F.

The other outlet of the first three-way valve 91 is connected to the other inlet of the second three-way valve 92 through a heat medium pipe 68G. The heat medium pipe 68G bypasses the motor 65 for running.

As the heat medium used in the waste heat recovering device 61, for example, water, a refrigerant like HFO-1234f, a liquid such as coolant, or a gas such as air can be adopted Incidentally, in the embodiment, water is used as the heat medium. Further, it is assumed that a jacket structure capable of circulating, for example, a heat medium in a heat exchange relationship with the battery 55 and the motor 65 for running is provided around the battery 55 and the motor 65 for running.

Then, when the second circulation pump 62 is operated in a state in which the inlet and one outlet are communicated with each other at the first three-way valve 91, and the first inlet and the outlet are communicated with each other at the second three-way valve 92, the heat medium discharged from the second circulation pump 62 flows into the heat medium flow passage 64A of the waste heat recovering heat exchanger 64 through the heat medium pipe 68A. The heat medium flowing out from the heat medium flow passage 64A of the waste heat recovering heat exchanger 64 reaches the battery 55 through the heat medium pipe 68B.

Thus, the heat medium exchanges heat with the battery 55 and then flows through the heat medium pipe 68, the first three-way valve 91, and the heat medium pipe 68D sequentially, and reaches the motor 65 for running. Thus, the heat medium exchanges heat with the motor 65 for running and then flows through the heat medium pipe 68E, the second three-way valve 92, and the heat medium pipe 68F sequentially, and is sucked into the second circulation pump 62 to be circulated in the heat medium pipe 68.

On the one hand, when the first three-way valve 91 is changed to a state of communicating the inlet and the other outlet with each other, and the second three-way valve 92 is changed to a state of communicating the second inlet and the outlet with each other, the heat medium passed through the battery 55 flows through the heat medium pipe 68C, the first three-way valve 91, the heat medium pipe 68G, the second three-way vale 92, and the heat medium pipe 68F sequentially and is sucked into the second circulation pump 62. That is, in this state, the heat medium is not circulated through the motor 65 for running and is circulated between the battery 55 and the heat medium flow passage 64A of the waste heat recovering heat exchanger 64.

On the other hand, one end of a branch pipe 72 as a branch circuit is connected to the outlet of the refrigerant pipe 13F of the refrigerant circuit R, i.e., the refrigerant pipe 13B on the refrigerant downstream side of a connecting portion of the refrigerant pipe 13F and the refrigerant pipe 13B at a position on the refrigerant downstream side (forward side) of the check valve 18 located in the refrigerant pipe 13A and on the refrigerant upstream side of the indoor expansion valve 8. This branch pipe 72 is provided with an auxiliary expansion valve 73 constituted of an electric valve. This auxiliary expansion valve 73 decompresses and expands the refrigerant flowing into the refrigerant flow passage 64B to be described later, of the waste heat recovering heat heater 64 and can also be fully closed.

Then, the other end of the branch pipe 72 is connected to the refrigerant flow passage 64B of the waste heat recovering heat exchanger 64. One end of a refrigerant pipe 74 is connected to an outlet of the refrigerant flow passage 64B. The other end of the refrigerant pipe 74 is connected to the refrigerant pipe 13C located on the refrigerant downstream side of the check valve 20 and in front of the accumulator 12 (refrigerant upstream side). Then, the auxiliary expansion valve 73 and the like of these also constitute a part of the refrigerant circuit R, and at the same time, constitute even a part of the waste heat recovering device 61.

When the auxiliary expansion valve 73 is open, the refrigerant (part or all of the refrigerant) discharged from the refrigerant pipe 13F and the outdoor heat exchanger 7 is decompressed by the auxiliary expansion valve 73 and then flows into the refrigerant flow passage 64B of the waste heat recovering heat exchanger 64 to evaporate there. The refrigerant absorbs heat from the heat medium flowing through the heat medium flow passage 64A in the process of flowing through the refrigerant flow passage 64B, and then is sucked into the compressor 2 via the accumulator 12.

Figure 2:
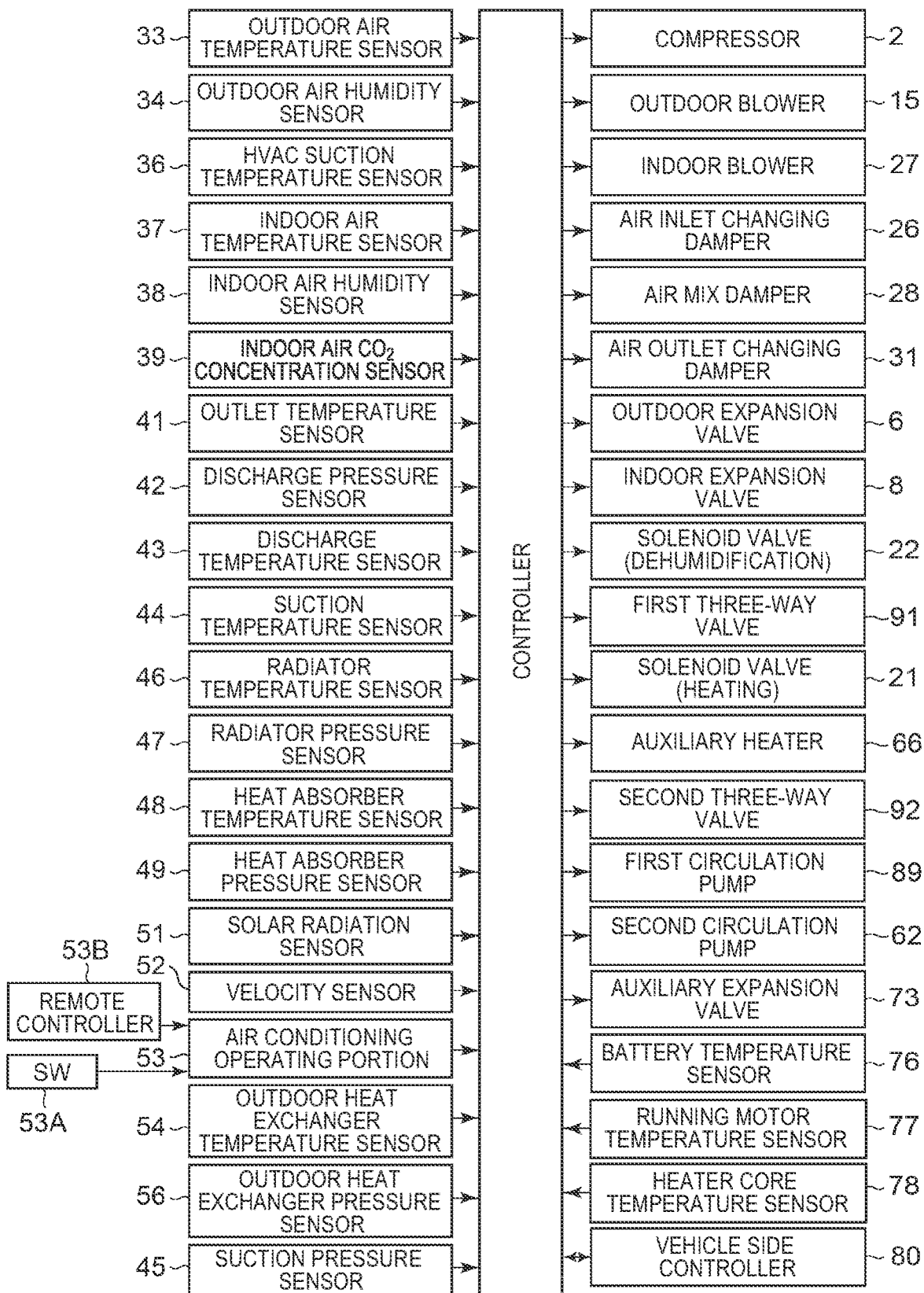
FIG. 2 is a block diagram of a controller as a control device of the vehicle air-conditioning device of FIG. 1.

Next, in FIG. 2, 32 is a controller as an embodiment of a control device which performs control of the vehicle air-conditioning device 1. The controller 32 is constituted of a microcomputer as an example of a computer having a processor. An input of the controller 32 (control device) is connected with respective outputs of an outdoor air temperature sensor 33 which detects an outdoor air temperature (Tam) of the vehicle, an outdoor air humidity sensor 34 which detects an outdoor air humidity (Ham), an HVAC suction temperature sensor 36 which detects a temperature of the air to be sucked from the suction port 25 to the air flow passage 3, an indoor air temperature sensor 37 which detects a temperature (indoor air temperature Tin) of the air (indoor air) of the vehicle interior, an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature of the air to be blown out from the air outlet 29 to the vehicle interior, a discharge pressure sensor 42 which detects a pressure Pd of the refrigerant discharged from the compressor 2, a discharge temperature sensor 43 which detects a temperature of the refrigerant discharged from the compressor 2, a suction temperature sensor 44 which detects a temperature Ts of the refrigerant to be sucked into the compressor 2, a suction pressure sensor 45 which detects a pressure Ps of the refrigerant sucked into the compressor 2, a radiator temperature sensor 46 which detects a temperature of the radiator 4 (the temperature of the air passed through the radiator 4 or the temperature of the radiator 4 itself: a radiator temperature TCI), a radiator pressure sensor 47 which detects a refrigerant pressure of the radiator 4 (the pressure of the refrigerant in the radiator 4 or immediately after the refrigerant flows out from the radiator 4: a radiator pressure PCI), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure of the refrigerant in the heat absorber 9 or immediately after the refrigerant flows out from the heat absorber 9), a solar radiation sensor 51 of, e.g., a photo sensor system to detect a solar radiation amount into the vehicle interior, a velocity sensor 52 to detect a moving speed (a velocity) of the vehicle, an air conditioning operating portion 53 to set the changing of a predetermined temperature or an air conditioning operation, an outdoor heat exchanger temperature sensor 54 which detects a temperature of the outdoor heat exchanger 7 (the temperature of the refrigerant immediately after the refrigerant flows out from the outdoor heat exchanger 7, or the temperature of the outdoor heat exchanger 7 itself: an outdoor heat exchanger temperature TXO. When the outdoor heat exchanger 7 functions as an evaporator, the outdoor heat exchanger temperature TXO becomes an evaporation temperature of the refrigerant in the outdoor heat exchanger 7), and an outdoor heat exchanger pressure sensor 56 which detects a refrigerant pressure of the outdoor heat exchanger 7 (the pressure of the refrigerant in the outdoor heat exchanger 7 or immediately after the refrigerant flows out from the outdoor heat exchanger 7).

In the FIG. 53A is an input switch provided in the air conditioning operating portion 53. Further, pre-air-conditioning required (reserved) information from a remote controller 53B provided in a vehicle key, for example is configured to be wirelessly input to the air conditioning operating portion 53.

The input of the controller 32 is further connected also with respective outputs of a battery temperature sensor 76 which detects a temperature of the battery 55 (a battery temperature Tb), a running motor temperature sensor 77 which detects a temperature of the motor 65 for running (a running motor temperature Tm), and a heater core temperature sensor 78 which detects a temperature of the heater core 23 (a heater core temperature Thc).

On the other hand, an output of the controller 32 is connected with the compressor 2, the outdoor blower 15, the indoor blower (the blower fan) 27, the air inlet changing damper 26, the air mix damper 28, the air outlet changing damper 31, the outdoor expansion valve 6, the indoor expansion valve 8, the solenoid valve 22 (dehumidification), the solenoid valve 21 (heating), the auxiliary heater 66, the first circulation pump 89, the second circulation pump 62, the first three-way valve 91, the second three-way valve 92, and the auxiliary expansion valve 73.

Further, the controller 32 performs transmission/reception of data to and from a vehicle side controller 80 which performs control of the entire vehicle such as running, charging of the battery 55, etc. Then, in regard to the controller 32, information as to whether or not a charging plug for the external power source (quick charger or the like) is connected to the vehicle, information as to whether or not the battery 55 is being charged, and various information (environment information, traffic information, etc.) acquired via an external network such as Internet are input from the vehicle side controller 80. Then, the controller 32 controls, based on the outputs of the respective sensors, the information from the vehicle side controller 80, the setting information input at the air conditioning operating portion 53, etc., controls these.

Next, an operation of the vehicle air-conditioning device 1 of the embodiment will be described with the above constitution. In this embodiment, the controller 32 (control device) changes and executes the respective air conditioning operations of the heating operation, the dehumidifying and heating operation, the dehumidifying and cooling operation, and the cooling operation, and recovers waste heat from the battery 55 (heat generating device) and the motor 65 for running to adjust their temperatures. Description will initially be made as to each air conditioning operation of the refrigerant circuit R in the vehicle air-conditioning device 1. Incidentally, the controller 32 operates the first circulation pump 89 and the second circulation pump 62 during the operation of the vehicle air-conditioning device 1.

(1) Heating Operation

FIG. 1 shows the flow (solid line arrows) of the refrigerant of the refrigerant circuit R in the heating operation other than pre-air-conditioning to be described later. In winter or the like, when an air conditioning switch included in the switch 53A of the air conditioning operating portion 53 is turned ON, and the heating operation is selected by the controller 32 (an automatic mode) or a manual operation to the air conditioning operating portion 53 (a manual mode), the controller 32 opens the solenoid valve 21 (for the heating) and fully closes the indoor expansion valve 8 and the auxiliary expansion valve 73. Consequently, the inflow of the refrigerant into the waste heat recovering heat exchanger 64 is blocked. Further, the controller closes the solenoid valve 22 (for the dehumidification).

Then, the controller operates the compressor 2 and the respective blowers 15 and 27, and the air mix damper 28 holds a state of adjusting a ratio at which the air blown out from the indoor blower 27 is to be passed through the radiator 4 and the heater core 23. Consequently, a high-temperature high-pressure gas refrigerant discharged from the compressor 2 flows into the radiator 4. Since the air in the air flow passage 3 passes through the radiator 4, the air in the air flow passage 3 is heated by the high-temperature refrigerant in the radiator 4. On the other hand, the refrigerant in the radiator 4 has the heat taken by the air and is cooled to condense and liquefy.

The refrigerant liquefied in the radiator 4 flows out from the radiator 4 and then flows through the refrigerant pipes 13E and 13J to reach the outdoor expansion valve 6. The refrigerant flowing into the outdoor expansion valve 6 is decompressed therein, and then flows into the outdoor heat exchanger 7. The refrigerant flowing into the outdoor heat exchanger 7 evaporates, and the heat is pumped up from the outdoor air passed by running or the outdoor blower 15 (heat absorption). That is, the refrigerant circuit R functions as a heat pump. Then, the low-temperature refrigerant flowing out from the outdoor heat exchanger 7 reaches the refrigerant pipe 13C through the refrigerant pipe 13A and the refrigerant pipe 13D, and the solenoid valve 21, and flows into the accumulator 12 via the check valve 20 in the refrigerant pipe 13C to perform gas-liquid separation therein, and the gas refrigerant is then sucked into the compressor 2, thereby repeating this circulation. The air heated in the radiator 4 is blown out from the air outlet 29, thereby performing the heating of the vehicle interior.

The controller 32 calculates a target radiator pressure PCO (a target value of the pressure PCI of the radiator 4) from a target heater temperature TCO (a target value of an air temperature on the leeward side of the radiator 4) calculated from an after-mentioned target outlet temperature TAO, and controls the number of revolutions of the compressor 2 on the basis of the target radiator pressure PCO and the refrigerant pressure of the radiator 4 which is detected by the radiator pressure sensor 47 (the radiator pressure PCI that is a high pressure of the refrigerant circuit R). Further, the controller controls a valve position of the outdoor expansion valve 6 on the basis of the temperature (the radiator temperature TCI) of the radiator 4 which is detected by the radiator temperature sensor 46 and the radiator pressure PCI detected by the radiator pressure sensor 47, and controls a subcool degree of the refrigerant in an outlet of the radiator 4. Further, when the heating capacity by the radiator 4 is insufficient, the auxiliary heater 66 is energized to generate heat, and the heat medium heated by the auxiliary heater 66 is circulated through the heater core 23, thereby supplementing the heating capacity.

Incidentally, when the heating operation is performed in the pre-air-conditioning to be described later, the controller 32 changes and executes the respective heating modes of the battery+the running motor waste heat recovery heating mode, the battery waste heat recovery heating mode, the auxiliary heater heating mode, the waste heat recovery cooperative heating mode, the waste heat recovery+auxiliary heater heating mode, and the outdoor heat exchanger frosting suppression heating mode, but these will be descried in detail later.

(2) Dehumidifying and Heating Operation

Figure 3:
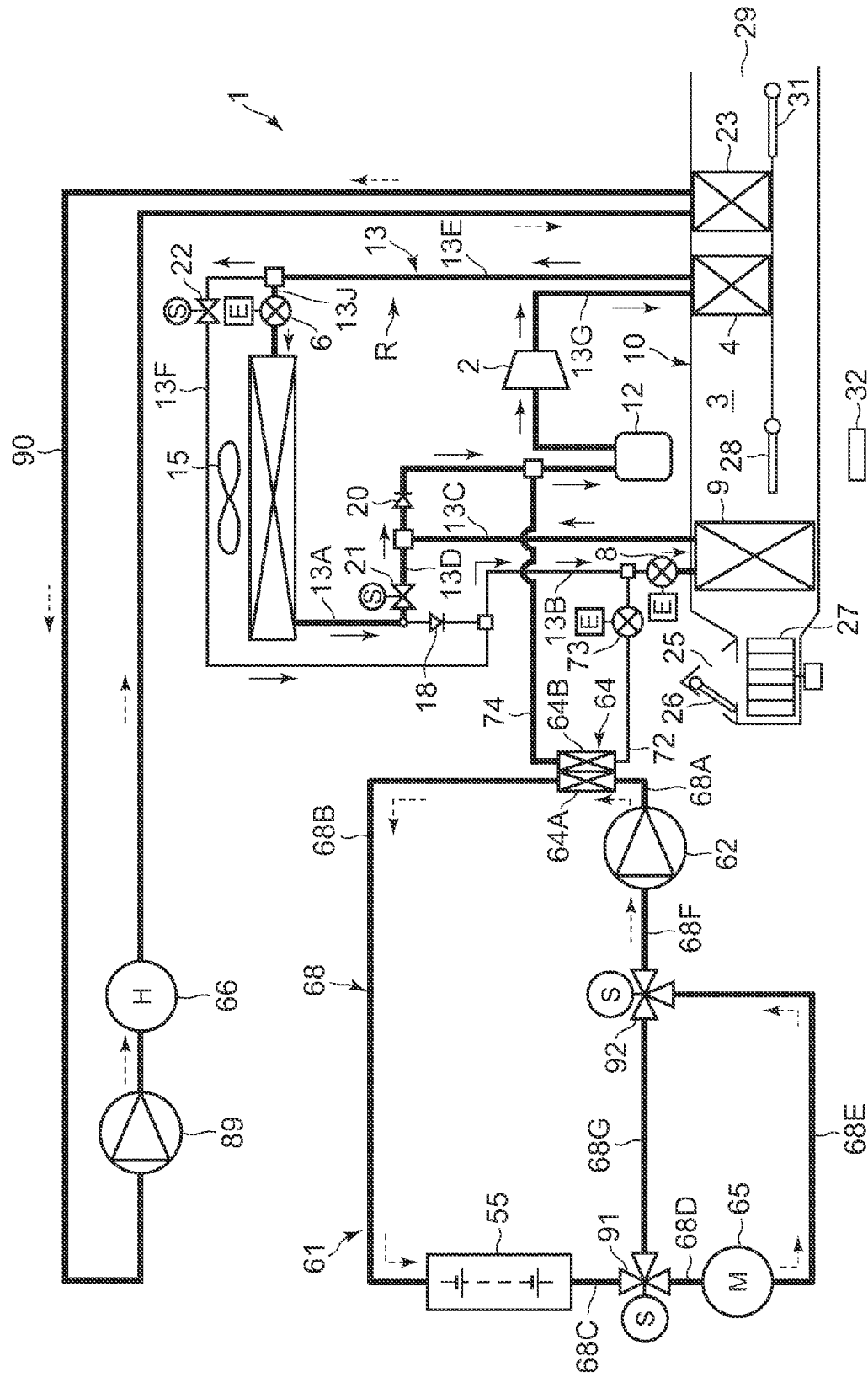
FIG. 3 is a diagram describing a dehumidifying and heating operation by the controller of FIG. 2.

Next, description will be made as to the dehumidifying and heating operation with reference to FIG. 3. FIG. 3 shows the flow (solid line arrows) of the refrigerant of the refrigerant circuit R in the dehumidifying and heating operation. In the dehumidifying and heating operation, the controller 32 opens the solenoid valve 22 in the above state of the heating operation and opens the indoor expansion valve 8 to set the refrigerant to its decompressed and expanded state. Consequently, a part of the condensed refrigerant flowing into the refrigerant pipe 13E through the radiator 4 is distributed, the distributed refrigerant flows through the solenoid valve 22 into the refrigerant pipe 13F and flows from the refrigerant pipe 13B into the indoor expansion valve 8, and the residual refrigerant flows through the outdoor expansion valve 6. That is, the distributed part of the refrigerant is decompressed in the indoor expansion valve 8, and then flows into the heat absorber 9 to evaporate.

The controller 32 controls a valve position of the indoor expansion valve 8 to maintain a superheat degree (SH) of the refrigerant in an outlet of the heat absorber 9 at a predetermined value, but water in the air blown out from the indoor blower 27 coagulates to adhere to the heat absorber 9 by a heat absorbing operation of the refrigerant which occurs in the heat absorber 9 at this time, and hence, the air is cooled and dehumidified. The distributed residual refrigerant flowing into the refrigerant pipe 13J is decompressed in the outdoor expansion valve 6, and then evaporates in the outdoor heat exchanger 7.

The refrigerant evaporated in the heat absorber 9 flows out to the refrigerant pipe 13C to join the refrigerant (the refrigerant from the outdoor heat exchanger 7) from the refrigerant pipe 13D, and then flows through the check valve 20 and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior.

The controller 32 controls the number of revolutions of the compressor 2 on the basis of the target radiator pressure PCO calculated from the target heater temperature TCO and the radiator pressure PCI (the high pressure of the refrigerant circuit R) detected by the radiator pressure sensor 47, and controls the valve position of the outdoor expansion valve 6 on the basis of the temperature (the heat absorber temperature Te) of the heat absorber 9 which is detected by the heat absorber temperature sensor 48.

(3) Dehumidifying and Cooling Operation

Figure 4:
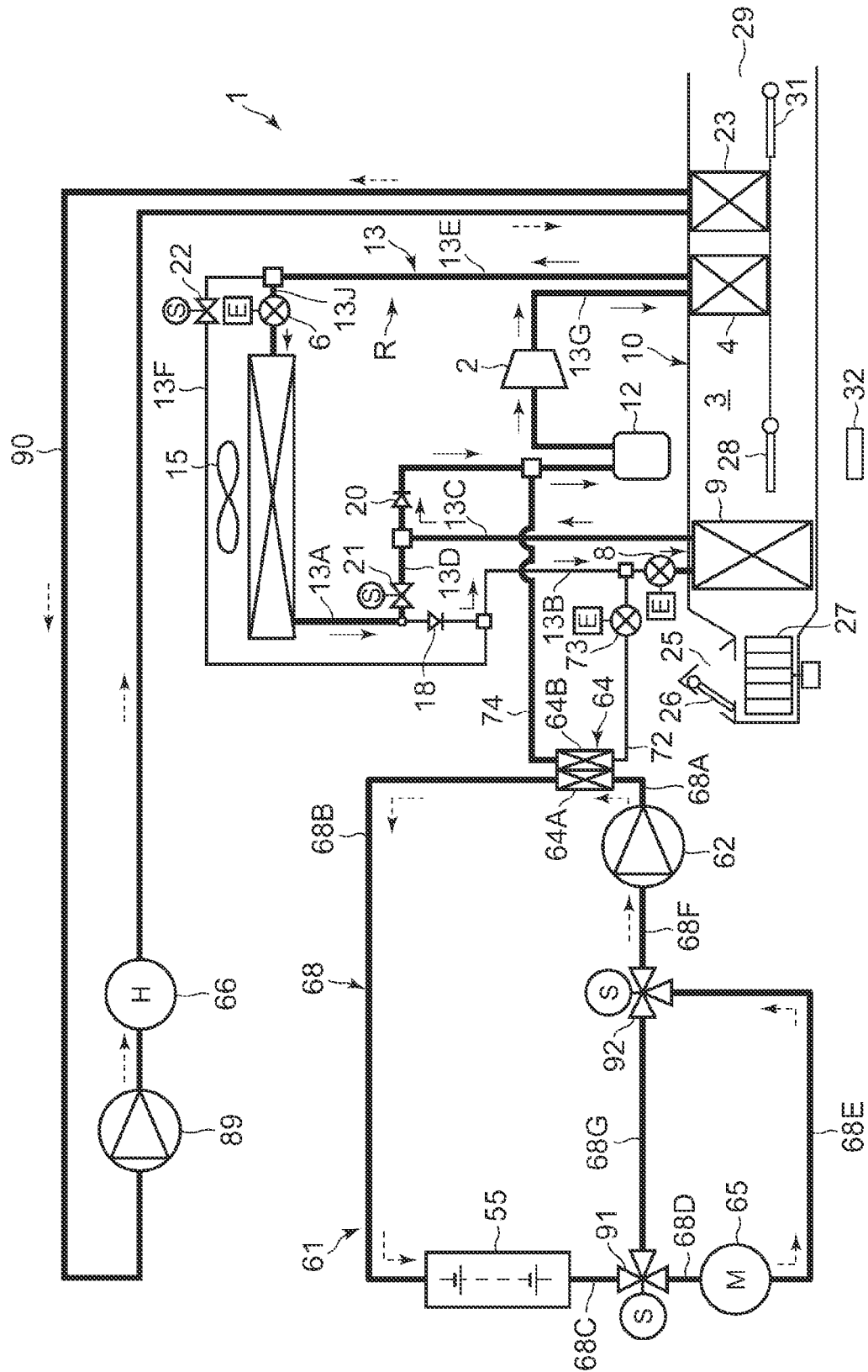
FIG. 4 is a diagram describing a dehumidifying and cooling operation and a cooling operation by the controller of FIG. 2.

Next, description will be made as to the dehumidifying and cooling operation with reference to FIG. 4. FIG. 4 shows the flow (solid line arrows) of the refrigerant of the refrigerant circuit R in the dehumidifying and cooling operation. In the dehumidifying and cooling operation, the controller 32 opens the indoor expansion valve 8 to bring the refrigerant into a decompressed and expanded state, and closes the solenoid valve 21 and the solenoid valve 22. Further, the controller also fully closes the auxiliary expansion valve 73. Then, the controller operates the compressor 2 and the respective blowers 15 and 27, and the air mix damper 28 holds a state of adjusting a ratio at which the air blown out from the indoor blower 27 is to be passed through the radiator 4 and the heater core 23.

Consequently, a high-temperature high-pressure gas refrigerant discharged from the compressor 2 flows into the radiator 4. Since the air in the air flow passage 3 passes through the radiator 4, the air in the air flow passage 3 is heated by the high-temperature refrigerant in the radiator 4. On the other hand, the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled to slightly open, to flow into the outdoor heat exchanger 7. The refrigerant flowing into the outdoor heat exchanger 7 is cooled by the running therein or the outdoor air passed through the outdoor blower 15 to condense. The refrigerant flowing out from the outdoor heat exchanger 7 flows through the refrigerant pipe 13A and the check valve 18 to enter the refrigerant pipe 13B and reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled and dehumidified.

The refrigerant evaporated in the heat absorber 9 flows through the refrigerant pipe 13C and the check valve 20 to reach the accumulator 12, and flows therethrough to be sucked into the compressor 2, thereby repeating this circulation. The air cooled and dehumidified in the heat absorber 9 is reheated in the process of passing the radiator 4 (reheating: a radiation capability is lower than that during the heating), thereby performing the dehumidifying and cooling of the vehicle interior.

The controller 32 controls, based on the temperature (the heat absorber temperature Te) of the heat absorber 9 which is detected by the heat absorber temperature sensor 48, and a target heat absorber temperature TEO being its target value, the number of revolutions of the compressor 2 to set the heat absorber temperature Te to the target heat absorber temperature TEO, and controls, based on the radiator pressure PCI (the high pressure of the refrigerant circuit R) detected by the radiator pressure sensor 47 and the target radiator pressure PCO (the target value of the radiator pressure PCI) calculated from the target heater temperature TCO, the valve position of the outdoor expansion valve 6 to set the radiator pressure PCI to the target radiator pressure PCO, thereby obtaining a required amount of reheat by the radiator 4.

(4) Cooling Operation

Next, description will be made as to the cooling operation. The flow of the refrigerant circuit R is similar to that in the dehumidifying and cooling operation of FIG. 4. In the cooling operation executed in summer or the like, the controller 32 fully opens the valve position of the outdoor expansion valve 6 in the above state of the dehumidifying and cooling operation. Incidentally, the air mix damper 28 holds a state of adjusting a ratio at which the air is to be passed through the radiator 4 and the heater core 23.

Consequently, the high-temperature high-pressure gas refrigerant discharged from the compressor 2 flows into the radiator 4. The air in the air flow passage 3 is passed through the radiator 4 but its ratio becomes small (because of only reheat during the cooling). Therefore, the refrigerant almost only passes the radiator, and the refrigerant flowing out from the radiator 4 flows through the refrigerant pipe 13E to reach the outdoor expansion valve 6. At this time, the outdoor expansion valve 6 is fully opened, and hence, the refrigerant passes the refrigerant pipe 13J through the outdoor expansion valve 6 as it is, and flows into the outdoor heat exchanger 7, in which the refrigerant is cooled by the running therein or the outdoor air ventilated by the outdoor blower 15, to condense and liquefy.

The refrigerant flowing out from the outdoor heat exchanger 7 flows through the refrigerant pipe 13A and the check valve 18 to enter the refrigerant pipe 13B and reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence, the air is cooled.

The refrigerant evaporated in the heat absorber 9 flows through the refrigerant pipe 13C and the check valve 20 to reach the accumulator 12, and flows therethrough to be sucked into the compressor 2, thereby repeating this circulation. The air cooled and dehumidified in the heat absorber 9 is blown out from the air outlet 29 to the vehicle interior, thereby performing the cooling of the vehicle interior. In this cooling operation, the controller 32 controls the number of revolutions of the compressor 2 on the basis of the temperature (the heat absorber temperature Te) of the heat absorber 9 which is detected by the heat absorber temperature sensor 48.

(5) Changing of Air Conditioning Operation

The controller 32 calculates the above-mentioned target outlet temperature TAO from the following equation (I). The target outlet temperature TAO is a target value of the temperature of the air to be blown out from the air outlet 29 to the vehicle interior.

$$TAO=(Tset-Tin) \times K + Tbal(f(Tset, SUN, Tam)) \quad (I)$$

where Tin is a temperature (an indoor air temperature) of the vehicle interior air which is detected by the indoor air temperature sensor 37, Tset is a predetermined temperature (a target vehicle interior air temperature) of the indoor air temperature Tin (the temperature of the vehicle interior air), which is set by the air conditioning operating portion 53, K is a coefficient, and Tbal is a balance value calculated from the target vehicle interior air temperature Tset, a solar radiation amount SUN detected by the solar radiation sensor 51, and the outdoor air temperature Tam detected by the outdoor air temperature sensor 33. Further, in general, the lower the outdoor air temperature Tam is, the higher the target outlet temperature TAO becomes, and the higher the outdoor air temperature Tam becomes, the lower the target outlet temperature TAO becomes.

Further, the controller 32 calculates the above-mentioned target heater temperature TCO by using the following equation (II) on the basis of the target outlet temperature TAO:

$$TCO=f(TAO) \quad (II)$$

Incidentally, f in the above equation (II) means a limit of controlling or an offset or the like. However, since TCO=TAO basically, the target heater temperature TCO also rises if the target outlet temperature TAO rises, and the target heater temperature TCO also decreases if the target outlet temperature TAO is lowered.

Then, the controller 32 selects any air conditioning operation from the above respective air conditioning operations on the basis of the outdoor air temperature Tam detected by the outdoor air temperature sensor 33 and the target outlet temperature TAO on startup. Further, after the startup, the controller selects and changes the above respective air conditioning operations in accordance with changes of environments and setting conditions such as the outdoor air temperature Tam and the target outlet temperature TAO.

(6) Control of Compressor 2 in Heating Operation by Controller 32

Figure 5:
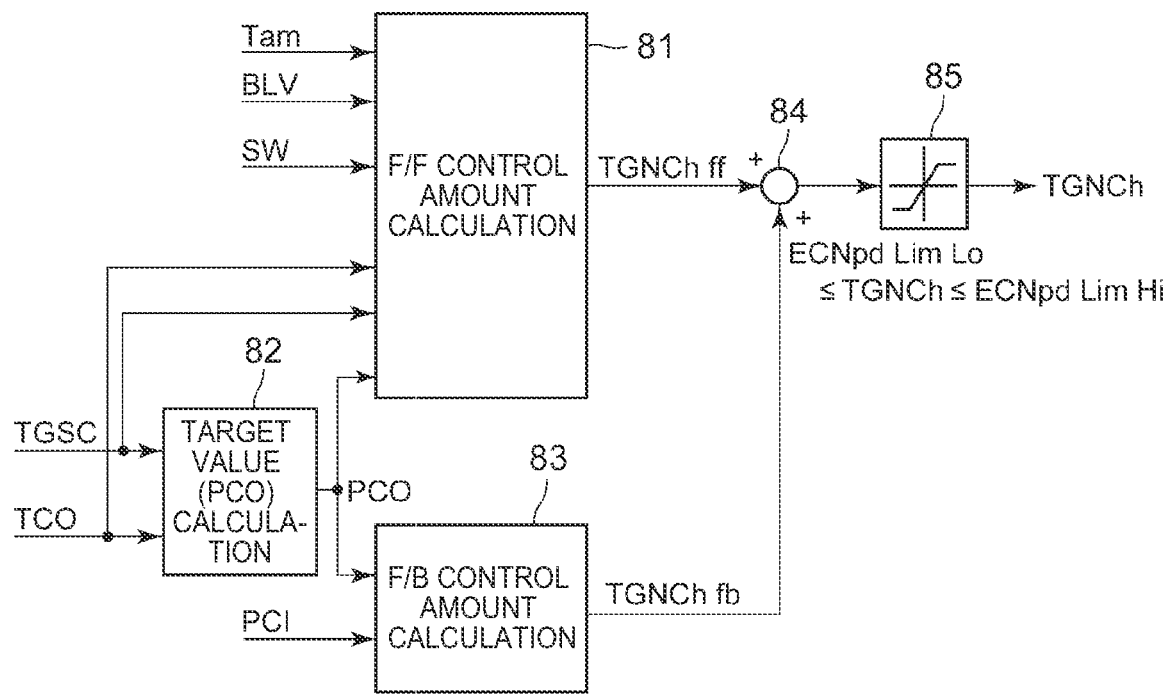
FIG. 5 is a control block diagram regarding compressor control in the heating operation of the controller of FIG. 2.

Next, the control of the compressor 2 in the aforementioned heating operation will be described in detail using FIG. 5. FIG. 5 is a control block diagram of the controller 32 which determines a target number of revolutions (a compressor target number of revolutions) TGNCh of the compressor 2 for the heating operation. An F/F (Feed Forward) control amount calculation section 81 of the controller 32 calculates an F/F control amount TGNChff of the compressor target number of revolutions on the basis of the outdoor air temperature Tam obtained from the outdoor air temperature sensor 33, a blower voltage BLV of the indoor blower 27, an air volume ratio SW by the air mix damper 28, a target supercool degree TGSC being a target value of a supercool degree SC at the outlet of the radiator 4, the target heater temperature TCO, and the target radiator pressure PCO being a target value of the pressure of the radiator 4.

The target radiator pressure PCO is calculated by a target value calculation section 82 based on the target supercool degree TGSC and the target heater temperature TCO described above. Further, an F/B (FeedBack) control amount calculation section 83 calculates an F/B control amount TGNChfb of the compressor target number of revolutions, based on the target radiator pressure PCO and the radiator pressure PCI being the refrigerant pressure of the radiator 4. Then, the F/F control amount TGNChff calculated by the F/F control amount calculation section 81 and TGNChfb calculated by the F/B control amount calculation section 83 are added by an adder 84 and attached with limits of an upper limit value ECNpdLimHi of controlling and a lower limit value ECNpdLimLo of controlling in a limit setting section 85, and then determined as the compressor target number of revolutions TGNCh. In the heating operation, the controller 32 controls the number of revolutions NC of the compressor 2 based on the compressor target number of revolutions TGNCh.

(7) Control of Auxiliary Heater 66 by Controller 32

Figure 6:
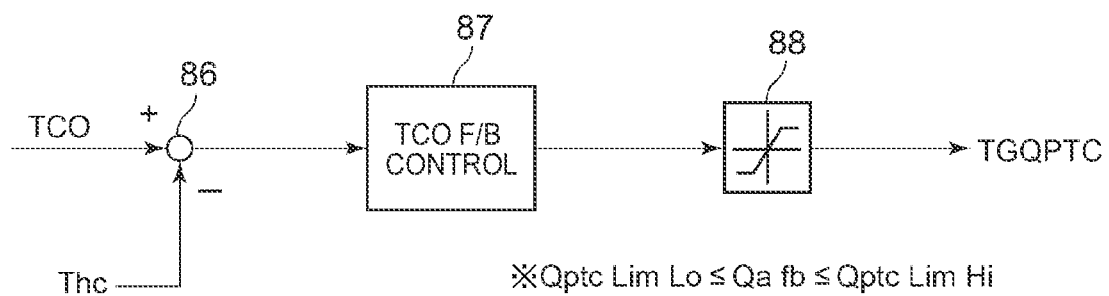
FIG. 6 is a control block diagram regarding control of an auxiliary heater by the controller of FIG. 2.

Further, FIG. 6 is a control block diagram of the controller 32 which determines an auxiliary heater required capability TGQPTC of the auxiliary heater 66 in the auxiliary heater heating mode to be described later. The target heater temperature TCO and the heater core temperature Thc are input to a subtracter 86 of the controller 32 to calculate a deviation (TCO−Thc) between the target heater temperature TCO and the heater core temperature Thc. The deviation (TCO−Thc)

is input to an F/B control section 87, and the F/B control section 87 eliminates the deviation (TCO−Thc) and calculates an auxiliary heater required capability F/B control amount Qafb so that the heater core temperature Thc becomes the target heater temperature TCO The auxiliary heater required capability F/B control amount Qafb calculated in the F/B control section 87 is added with limits of an upper limit value QptcLimHi of controlling and a lower limit value QptcLimLo of controlling in a limit setting section 88 and then determined as the auxiliary heater required capability TGQPTC. In the auxiliary heater heating mode, the controller 32 controls the energization of the auxiliary heater 66 based on the auxiliary heater required capability TGQPTC to thereby control the heat generation (heating) of the auxiliary heater 66 so that the heater core temperature Thc becomes the target heater temperature TCO.

(8) Pre-Air-Conditioning by Controller 32

Next, the pre-air-conditioning of the vehicle interior by the controller 32, more specifically, the heating operation in the pre-air-conditioning will be described in detail with reference to FIGS. 7 to 14. The controller 32 has the function of the pre-air-conditioning of preliminarily air conditioning the vehicle interior before boarding. A request (reservation) for this pre-air-conditioning can be made by the operation of the remote controller 53B provided in the vehicle key, for example. For example, the boarding time is assumed to be reversed and set. The controller 32 starts the pre-air-conditioning from the time before a predetermined pre-air-conditioning specified time from the reserved boarding time. Accordingly, the set boarding time becomes the end time of pre-air-conditioning. Incidentally, in the embodiment, when the pre-air-conditioning is executed, the controller 32 changes the air inlet changing damper 26 to the indoor air circulating to fix its state.

Figure 7:
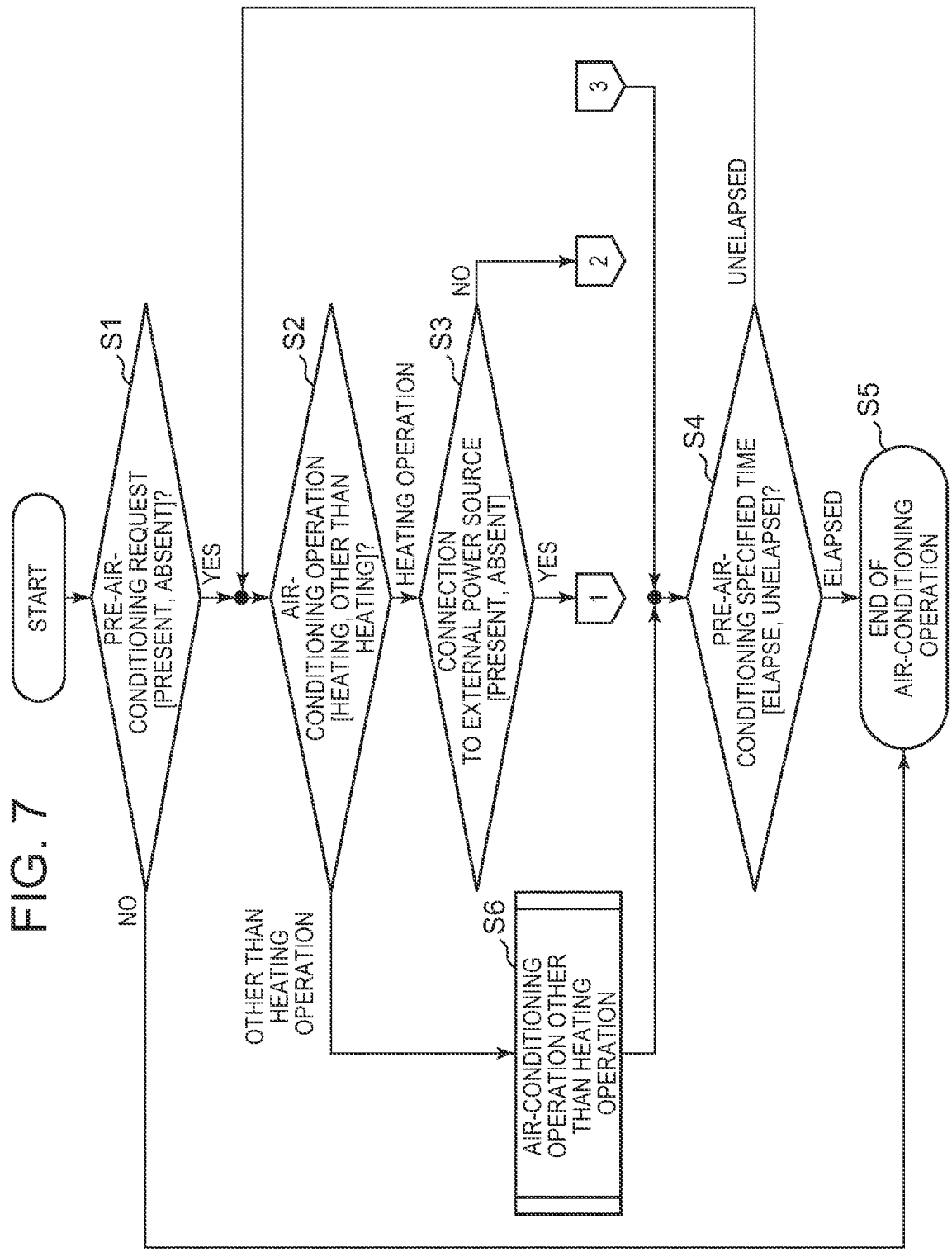
FIG. 7 is a flowchart describing control of pre-air-conditioning by the controller of FIG. 2.
Figure 8:
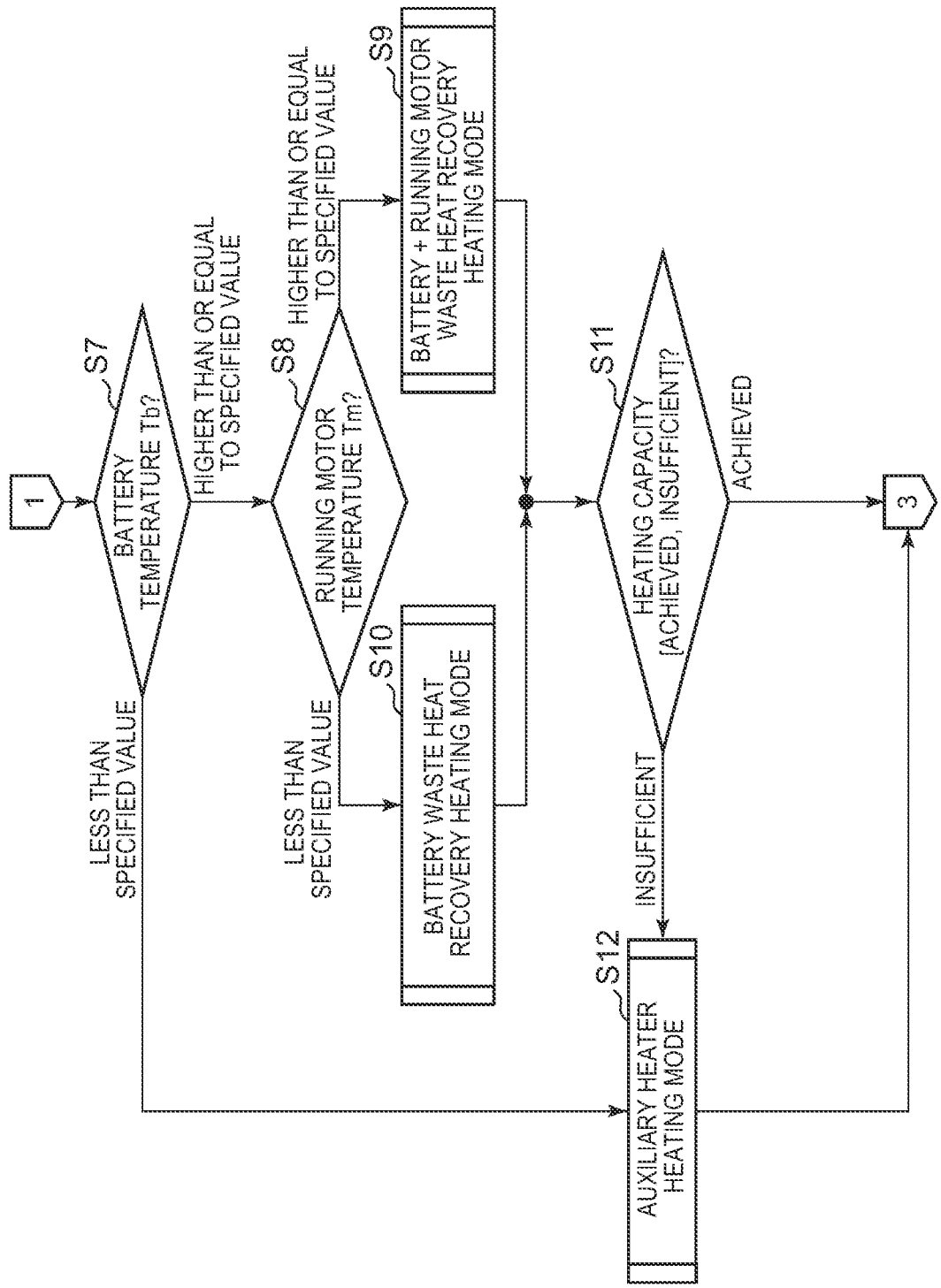
FIG. 8 is another flowchart describing control of pre-air-conditioning by the controller of FIG. 2.
Figure 9:
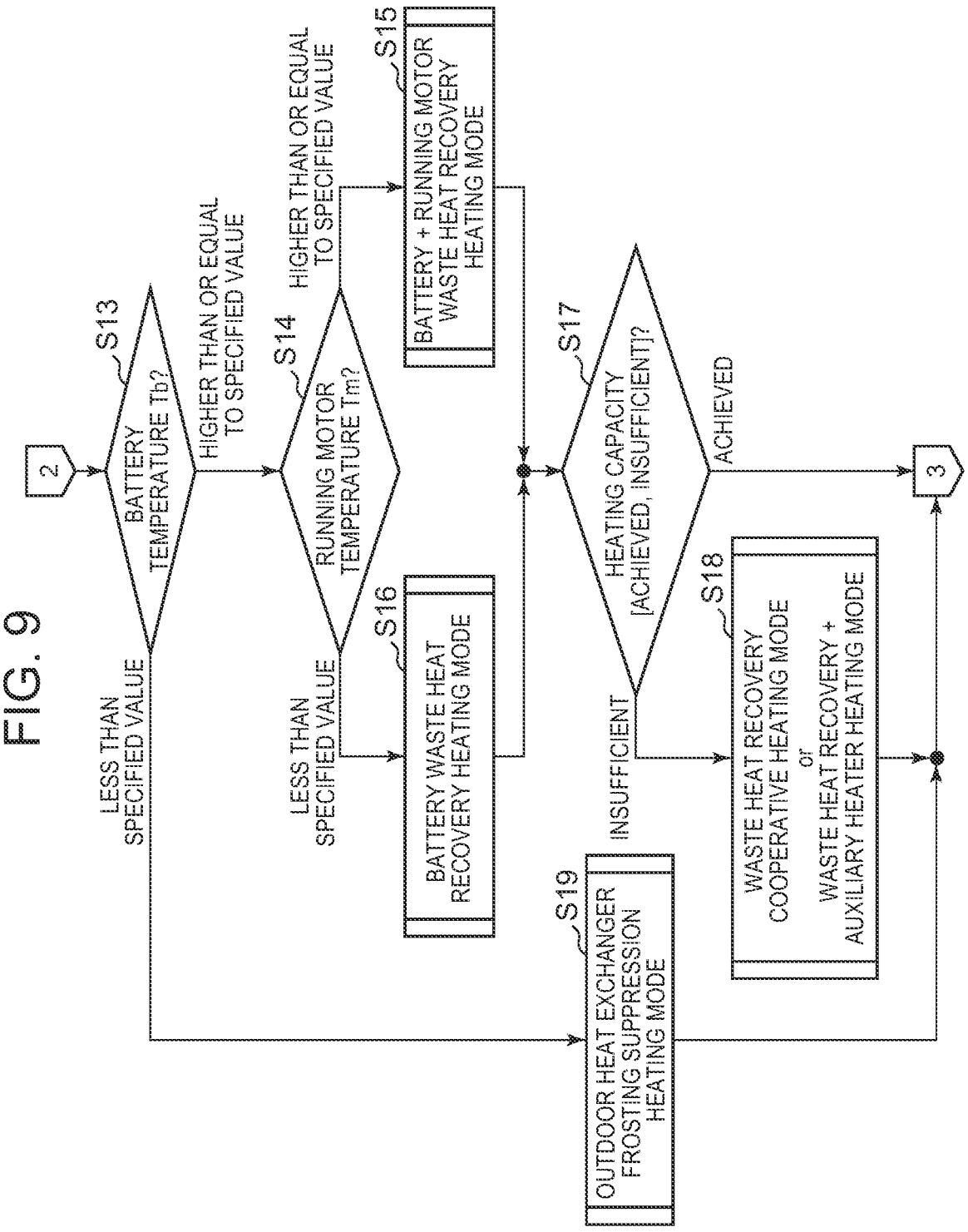
FIG. 9 is a further flowchart describing control of pre-air-conditioning by the controller of FIG. 2.

FIGS. 7 through 9 are flows charts regarding the control of the pre-air-conditioning by the controller 32. The controller 32 determines the presence or absence of the pre-air-conditioning request in Step S1 of FIG. 7. In the case of the absence, the controller proceeds to Step S5 to end the air conditioning. When a user makes the above-described request for the pre-air-conditioning by means of the remote controller 53B, the controller 32 proceeds from Step S1 to Step S2 to determine whether or not the air conditioning operation selected as described above is the heating operation or other than the heating operation (the dehumidifying and heating operation, the dehumidifying and cooling operation, the cooling operation). In the case of the air conditioning operation other than the heating operation, the controller proceeds to Step S6 to execute the air conditioning operation other than the heating operation.

When the air conditioning selected in Step S2 is the heating operation, the controller 32 proceeds to Step S3 to then determine whether a connection to the eternal power source is present or absent. Now, the vehicle is parked, and in that state, a charging plug of the external power source (quick charger or the like) is connected to a connection port of the vehicle. Further, when the battery 55 is being charged or is in a rechargeable state (if yes), the controller 32 proceeds to Step S7 of FIG. 8.

(8-1) Pre-Air-Conditioning in State in which Vehicle is Connected to External Power Source That is, when the controller 32 executes pre-air conditioning in the state in which the vehicle is connected to the external power source, the controller proceeds to Step S7 to first determine whether the battery temperature Tb detected by the battery temperature sensor 76 is higher than or equal to a predetermined specified value or less than the specified value. The specified value of the battery temperature Tb is taken as a predetermined temperature (actually, for example, the lower limit value in the appropriate temperature range of the battery 55) that makes it possible to recover the waste heat from the battery 55 and does not overcool the battery 55.

Now, when the battery temperature Tb is higher than or equal to the specified value, the controller 32 proceeds to Step S8, and this time, determines whether the running motor temperature Tm detected by the running motor temperature sensor 77 is higher than or equal to the predetermined specified value or less than the specified value. The specified value of the running motor temperature Tm is taken as a predetermined temperature at which waste heat can be recovered from the motor 65 for running (actually, for example, a temperature higher than the outdoor air temperature Tam).

(8-1-1) Battery+Running Motor Waste Heat Recovery Heating Mode

Then, when the running motor temperature Tm is higher than or equal to the specified value in Step S8, the controller 32 proceeds to Step S9 to execute the battery+running motor waste heat recovery heating mode. In this battery+running motor waste heat recovery heating mode, the waste heat of the battery 55 and the motor 65 for running is recovered and used for heating of the vehicle interior in the radiator 4.

Figure 10:
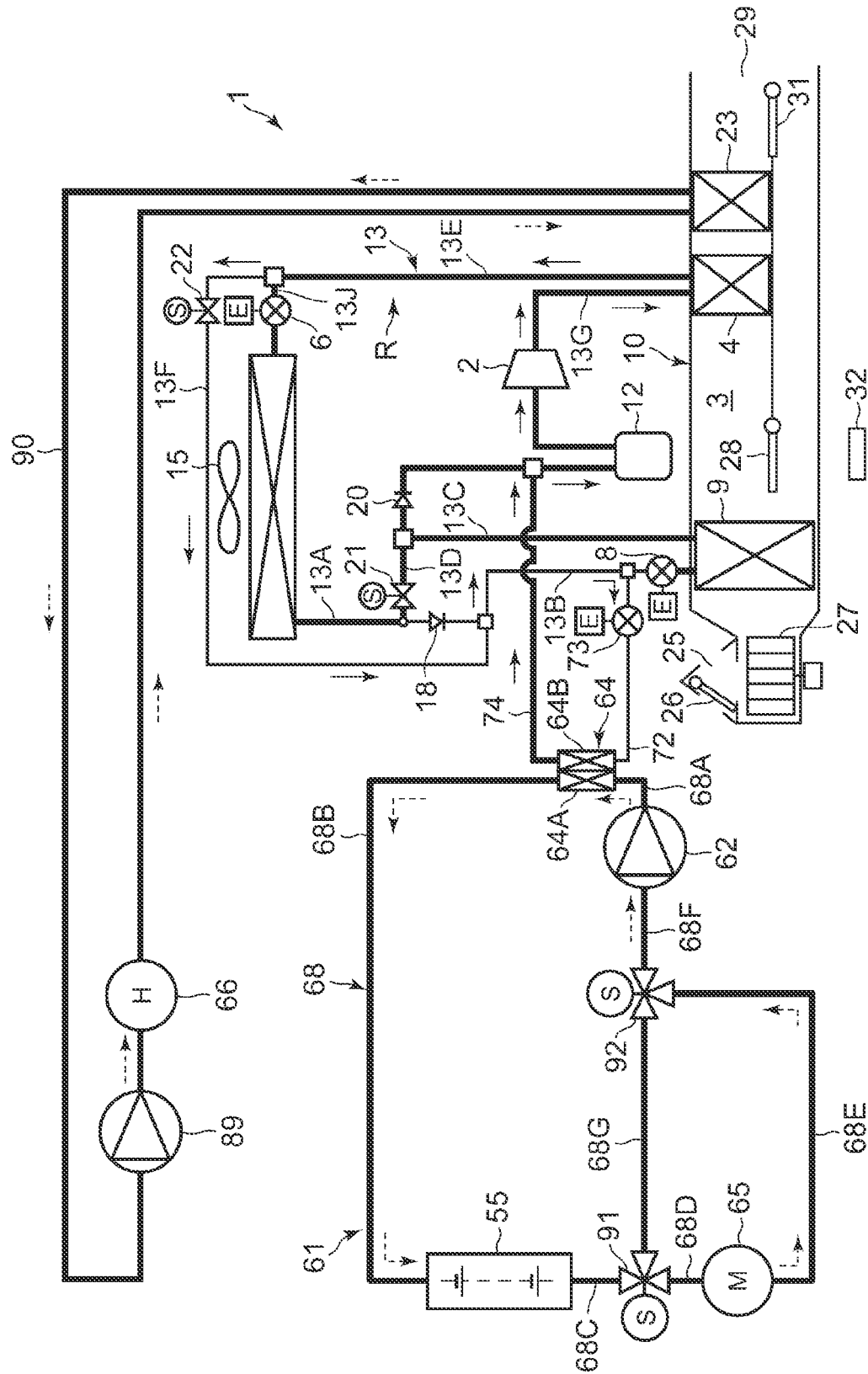
FIG. 10 is a diagram describing a battery+running motor waste heat recovery heating mode for a heating operation in pre-air-conditioning by the controller of FIG. 2.

FIG. 10 shows the Dow (solid line arrows) of the refrigerant and the flow (broken line arrows) of the heat medium of the refrigerant circuit R in the battery+running motor waste heat recovery heating mode. In the battery+running motor waste heat recovery heating mode, the controller 32 fully closes the outdoor expansion valve 6 and closes the solenoid valve 21. Consequently, the inflow of the refrigerant into the outdoor heat exchanger 7 is prevented. On the other hand, the solenoid valve 22 is opened, and the auxiliary expansion valve 73 is also opened to put its valve position in a controlled state. Incidentally, the indoor expansion valve 8 is also fully closed, and the auxiliary heater 66 is not energized.

Consequently, all of the refrigerant discharged from the radiator 4 does not flow into the outdoor expansion valve 6 and reaches the refrigerant pipe 13B on the refrigerant upstream side of the indoor expansion valve 8 via the refrigerant pipe 13F. The refrigerant then enters the branch pipe 72, is decompressed by the auxiliary expansion valve 73, and then flows into the refrigerant flow passage 64B of the waste heat recovering heat exchanger 64 through the branch pipe 72 to evaporate. At this time, it exerts a heat absorbing operation. A circulation is repeated in which the refrigerant evaporated in the refrigerant flow passage 64B flows through the refrigerant pipe 74, the refrigerant pipe 13C, and the accumulator 12 in sequence and is sucked into the compressor 2 (this is indicated by solid line arrows in FIG. 10).

On the other hand, the controller 32 operates the second circulation pump 62 in a state where the inlet and one outlet of the first three-way valve 91 are communicated with each other, and one inlet and the outlet of the second three-way valve 92 are communicated with each other Consequently, a circulation is performed in which the heat medium discharged from the second circulation pump 62 flows into the heat medium pipe 68 in order of the heat medium flow passage 64A of the waste heat recovering heat exchanger 64, the battery 55, and the motor 65 for running and is sucked into the second circulation pump 62 (this is indicated by broken line arrows in FIG. 10).

Thus, the heat medium heat-absorbed and cooled by the refrigerant in the heat medium flow passage 64A of the waste heat recovering heat exchanger 64 is circulated to the battery 55 and the motor 65 for running, and performs heat exchange with the battery 55 and the motor 65 for running to recover the waste heat of the battery 55 and the motor 65 for running and cool the battery 55 and the motor 65 for running. The waste heat recovered from the battery 55 and the motor 65 for running is pumped up by the waste heat recovering heat exchanger 64 into the refrigerant and used for heating of the vehicle interior in the radiator 4. Consequently, the vehicle interior is heated without using the outdoor heat exchanger 7 in the pre-air conditioning.

(8-1-2) Battery Waste Heat Recovery Heating Mode

On the other hand, when the running motor temperature Tm is less than the specified value in Step S8, the controller 32 proceeds to Step S10 to execute the battery waste heat recovery heating mode That is, when the battery temperature Th is higher than or equal to the specified value but the running motor temperature Tm is less than the specified value, the battery waste heat recovery heating mode is executed. In this battery waste heat recovery heating mode, the waste heat of the battery 55 is recovered and used for heating of the vehicle interior in the radiator 4.

Figure 11:
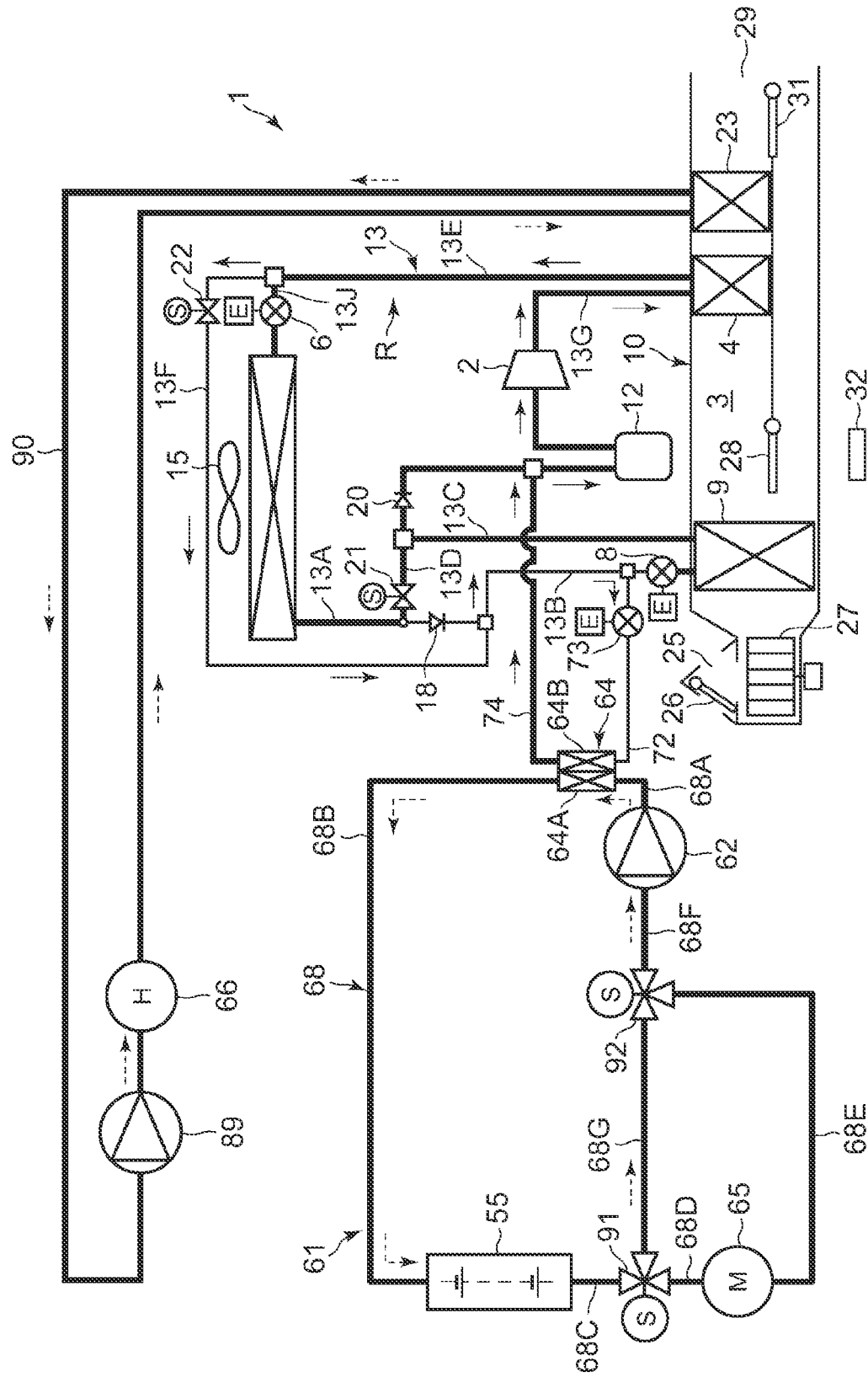
FIG. 11 is a diagram describing a battery waste heat recovery heating mode for the heating operation in the pre-air-conditioning by the controller of FIG. 2.

FIG. 11 shows the flow (solid line arrows) of the refrigerant and the flow (broken line arrows) of the heat medium in the refrigerant circuit R in this battery waste heat recovery heating mode Even in the battery waste heat recovery heating mode, the controller 32 fully closes the outdoor expansion valve 6 and closes the solenoid valve 21. Consequently, the inflow of the refrigerant into the outdoor heat exchanger 7 is blocked. On the other hand, the solenoid valve 22 is opened, and the auxiliary expansion valve 73 is also opened to put its valve position in a controlled state. Incidentally, the indoor expansion valve 8 is also fully closed, and the auxiliary heater 66 is not energized.

Thus, all of the refrigerant discharged from the radiator 4 does not flow into the outdoor expansion valve 6, and flows through the refrigerant pipe 13F to reach the refrigerant pipe 13B on the refrigerant upstream side of the indoor expansion valve 8. Next, the refrigerant enters the branch pipe 72 and is decompressed by the auxiliary expansion valve 73, and then flows into the refrigerant flow passage 64B of the waste heat recovering heat exchanger 64 through the branch pipe 72 to evaporate. At this time, it exerts a heat absorbing operation. A circulation is repeated in which the refrigerant evaporated in the refrigerant flow passage 64B flows through the refrigerant pipe 74, the refrigerant pipe 13C, and the accumulator 12 sequentially to be sucked into the compressor 2 (this is indicated by the solid line arrows in FIG. 11).

On the other hand, the controller 32 operates the second circulation pump 62 in a state in which the inlet and the other outlet of the first three-way valve 91 are communicated with each other, and the other inlet and the outlet of the second three-way valve 92 are communicated with each other. Consequently, a circulation is performed in which the heat medium discharged from the second circulation pump 62 flows into the heat medium pipe 68 in order of the heat medium flow passage 64A of the waste heat recovering heat exchanger 64, the battery 55, and the heat medium pipe 68G to be sucked into the second circulation pump 62 (this is indicated by broken line arrows in FIG. 11).

Thus, the heat medium that is made endothermic and cooled by the refrigerant in the heat medium flow passage 64A of the waste heat recovering heat exchanger 64 is circulated to the battery 55, and performs heat exchange with the battery 55 to recover the waste heat from the battery 55 and cool the battery 55. That is, the heat medium is not circulated to the motor 65 for running. The waste heat recovered from the battery 55 is pumped up by the waste heat recovering heat exchanger 64 into the refrigerant, which is used for heating of the vehicle interior in the radiator 4. Even in this case, the vehicle interior is heated without using the outdoor heat exchanger 7 in the pre-air-conditioning.

(8-1-3) Auxiliary Heater Heating Mode

Incidentally, when the battery temperature Tb is less than the specified value in Step S7, the controller 32 proceeds to Step S12 to execute the auxiliary heater heating mode. In this auxiliary heater heating mode, the auxiliary heater 66 is caused to generate heat, thereby performing the heating of the vehicle interior by the heater core 23.

Figure 12:
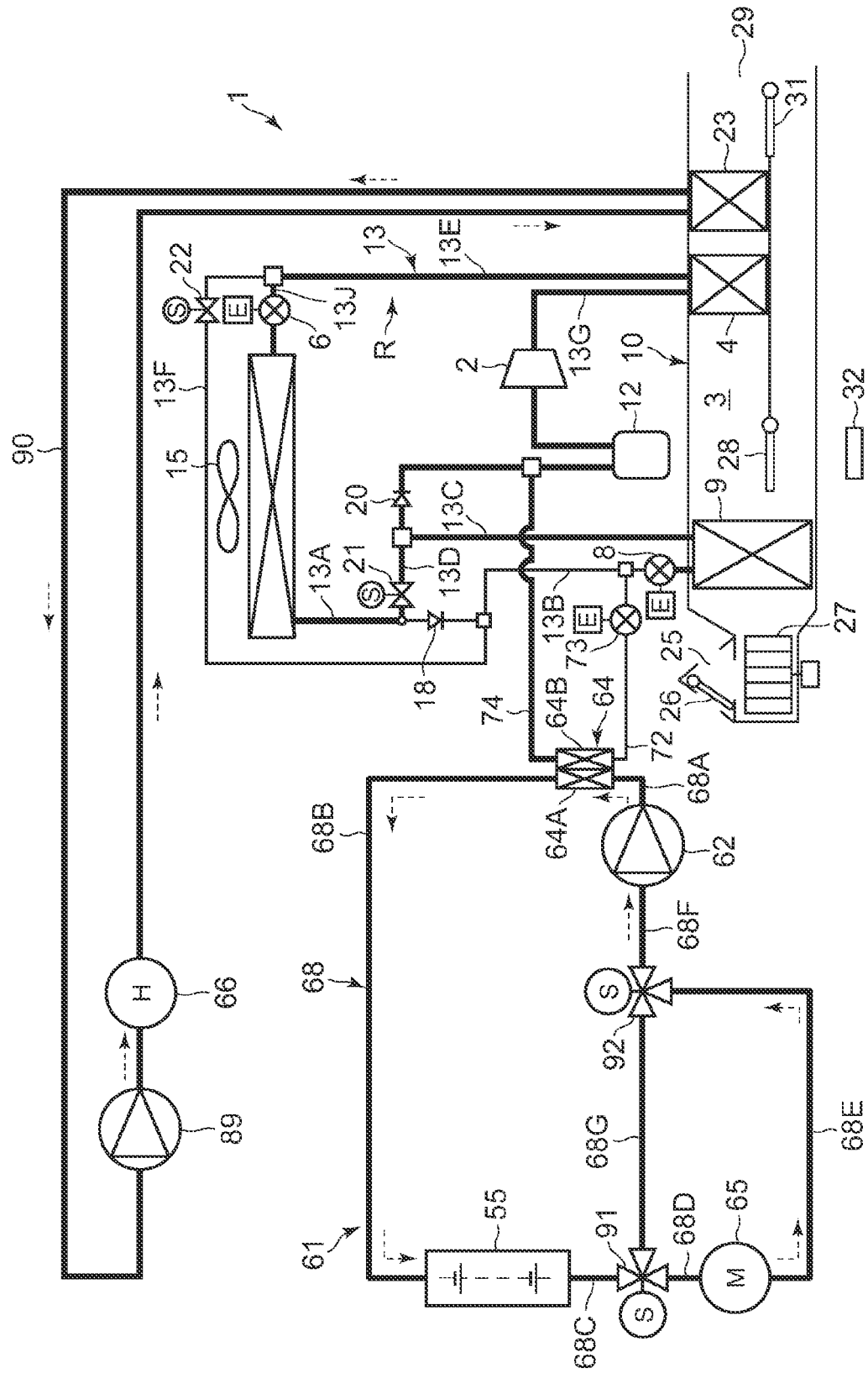
FIG. 12 is a diagram describing an auxiliary heater heating mode for the heating operation in the pre-air-conditioning by the controller of FIG. 2.

FIG. 12 shows the flow (broken line arrows) of the heat medium in the auxiliary heater heating mode. In the auxiliary heater heating mode, the controller 32 stops the compressor 2 and the outdoor blower 15 in the refrigerant circuit R and energizes the auxiliary heater 66 to heat the vehicle interior only by the heater core 23. In this case, the controller 32 controls the energization (heat generation) of the auxiliary heater 66 on the basis of the heater core temperature Thc detected by the heater core temperature sensor 78 and the target heater temperature TCO as described above.

Further, the controller 32 operates the indoor blower 27, and the air mix damper 28 holds a state of ventilating the air in the air flow passage 3 blown out from the indoor blower 27 to the radiator 4 and the heater core 23 to reach a state of adjusting an air volume. The heat medium heated by the auxiliary heater 66 is circulated to the heater core 23. Then, the air heated by the heater core 23 is blown out from the air outlet 29 into the vehicle interior, so that the vehicle interior is heated. In this auxiliary heater heating mode, the compressor 2 is stopped, and the refrigerant does not flow into the outdoor heat exchanger 7.

Thus, when the battery temperature Tb is less than the specified value, the interior of the vehicle is heated without using the outdoor heat exchanger 7 and without recovering the waste heat from the battery 55. At this time, since the external power source is connected to the vehicle, there is no need to worry about the power consumption of the battery 55 by the auxiliary heater 66.

Here, the controller 32 starts the battery+running motor waste heat recovery heating mode in Step S9, or starts the battery waste heat recovery heating mode in Step S10, and then proceeds to Step S11 to determine whether the radiator 4 has achieved or lacked the heating capacity in the vehicle interior.

In this case, in the heating operation, the controller 32 calculates a target heating capacity TGQhp being the heating capability of the vehicle interior required for the radiator 4, and a heating capacity Qhp generable by the radiator 4 by using the following equations (III) and (IV), for example.

$$TGQhp=(TCO-Te) \times Cpa \times \rho \times Qair \qquad (III)$$

$$Qhp=f(Tam,NC,BLV,VSP,FANVout,Te) \qquad (IV)$$

where Te is a temperature of the heat absorber 9 detected by the heat absorber temperature sensor 48, Cpa is a specific heat of air flowing into the radiator 4 [kj/kg·K], $\rho$ is a density of the air flowing into the radiator 4 (specific volume) [kg/m$^3$], Qair is an amount of the air passing through the radiator 4 [m$^3$/h] (estimated from the blower voltage BLV of the indoor blower 27, etc.), VSP is a velocity obtained from the velocity sensor 52, and FANVout is a voltage of the outdoor blower 15.

Then, when the waste heat recovered from the battery 55 and the motor 65 for running is insufficient in the heating capacity in the vehicle interior (Qhp<TGQhp), the controller 32 proceeds from Step S11 to Step S12 to exit the battery+running motor waste heat recovery heating mode (FIG. 10) and the battery waste heat recovery heating mode (FIG. 11) and to make a change to the aforementioned auxiliary heater heating mode (FIG. 12).

Consequently, when the heating capacity of the radiator 4 is insufficient in the battery+running motor waste heat recovery heating mode or the battery waste heat recovery heating mode, the auxiliary heater 66 is caused to generate heat without using the outdoor heat exchanger 7 and without recovering the waste heat from the battery 55 and the motor 65 for running to thereby heat the vehicle interior by the heater core 23. Since the external power source is connected to the vehicle at this time as well, there is no need to worry about the power consumption of the battery 55 by the auxiliary heater 66.

Thus, when the temperature of the battery 55 or the motor 65 for running is higher than or equal to the specified value where the controller 32 executes the heating operation by pre-air-conditioning, the controller executes the battery+running motor waste heat recovery heating mode or the battery waste heat recovery heating mode to heat the vehicle interior. Therefore, it becomes possible to heat the vehicle interior before boarding by effectively utilizing the waste heat of the battery 55 or the motor 65 for running which generates heat until the temperature is higher than or equal to the specified value, and to effectively pre-air condition the vehicle interior without causing frost to form on the outdoor heat exchanger 7.

Consequently, it becomes possible to reduce the load when executing the heating operation in which the outdoor heat exchanger 7 absorbs heat from the outdoor air during running or the like after boarding is reduced, suppress frost formation on the outdoor heat exchanger 7 especially under a low outdoor air temperature environment, and extend the period during which heating can be performed with high efficiency.

In particular, since the vehicle air-conditioning device 1 is provided which operates by being supplied with power from the battery 55, it becomes also possible to prevent in advance the inconvenience that the battery temperature Tb drops too much so that the battery 55 is deteriorated, thereby reducing the charge/discharge efficiency.

Further, in the embodiment, when the controller 32 executes pre-air-conditioning in the state in which the vehicle is connected to the external power source, the auxiliary heater heating mode is executed when the heating capacity by the radiator 4 is insufficient. Therefore, when the heating capacity in the vehicle interior cannot be achieved by recovering the waste heat from the battery 55 and the motor 65 for running, the auxiliary heater 66 is caused to generate heat to thereby enable the vehicle interior to be heated by the heater core 23. In this case, since the external power source is connected to the vehicle and there is no need to worry about the battery 55 being exhausted due to the power consumption of the auxiliary heater 66, effective vehicle interior heating by pre-air-conditioning can be achieved.

In addition, in the embodiment, when the controller 32 executes pre-air-conditioning in the state in which the vehicle is connected to the external power source, the auxiliary heater heating mode is executed to heat the vehicle interior even when the temperature of the battery 55 is lower than the specified value. Therefore, when the recovery of the waste heat from the battery 55 cannot be expected, the compressor 2 is stopped, and the auxiliary heater 66 is caused to generate heat, thereby enabling the vehicle interior to be heated by the heater core 23. In this case as well, since the external power source is connected to the vehicle and there is no need to worry about the battery 55 being exhausted due to the power consumption of the auxiliary heater 66, it is possible to achieve effective vehicle interior heating by pre-air-conditioning in like manner.

Furthermore, in the embodiment, when the controller 32 executes pre-air-conditioning, the air inlet changing damper 26 is changed to the indoor air circulating, so that the heating of the vehicle interior can be performed efficiently without introducing the outdoor air low in temperature into the vehicle interior during the pre-air-conditioning.

(8-2) Pre-Air-Conditioning when Vehicle is not Connected to External Power Source Next, the heating operation of pre-air-conditioning when the vehicle is parked but not connected to the external power source will be described. When the vehicle is not connected to the external power source in Step S3 of FIG. 7 (no connection to the external power source), the controller 32 proceeds to Step S13 of FIG. 9.

That is, when the controller 32 executes pre-air-conditioning in the state in which the vehicle is not connected to the external power source, the controller proceeds to Step S13, and in this case as well, determines whether the battery temperature Tb detected by the battery temperature sensor 76 is higher than or equal to the above-mentioned specified value or less than the specified value. Then, when the battery temperature Tb is higher than or equal to the specified value, the controller 32 proceeds to Step S14 to determine whether the running motor temperature Tm detected by the running motor temperature sensor 77 is higher than or equal to the above-mentioned specified value or less than the specified value.

Then, when the running motor temperature Tm is higher than or equal to the specified value in Step S14, the controller 32 proceeds to Step S15 to execute the battery+running motor waste heat recovery heating mode (FIG. 10) described in the above (8-1-1).

On the other hand, when the running motor temperature Tm is less than the specified value in Step S14, the controller 32 proceeds to Step S16 to execute the battery waste heat recovery heating mode (FIG. 11) described in the above (8-1-2). That is, when the battery temperature Tb is higher than or equal to the specified value but the running motor temperature Tm is less than the specified value, the battery waste heat recovery heating mode is executed.

(8-2-1) Outdoor Heat Exchanger Frosting Suppression Heating Mode

Incidentally, when the battery temperature Tb is less than the specified value in Step S13, the controller 32 proceeds to Step S19 to execute the outdoor heat exchanger frosting suppression heating mode. The way of flow of the refrigerant in the outdoor heat exchanger frosting suppression heating mode is the same as the way of flow of the refrigerant in the refrigerant circuit R in the heating operation in other than the pre-air-conditioning in FIG. 1. However, the controller 32 lowers the above-described target heater temperature TCO by a predetermined value as compared with the case of the heating operation in other than the pre-air-conditioning, and/or lowers the air volumes of the outdoor blower 15 and the indoor blower 27 by a predetermined value.

The target heater temperature TCO and air volumes lowered as described above are values in a range in which frost does not form on the outdoor heat exchanger 7, and for example, a table of the predetermined values is obtained in advance based on the outdoor air temperature Tam and the outdoor air humidity Ham. Thus, although the heating capacity in the vehicle interior is reduced, the heating load of the refrigerant circuit R is reduced, so that it is possible to eliminate the frost formation on the outdoor heat exchanger 7 or prevent the frost from forming as much as possible. Further, since the power consumption of the compressor 2 and the respective blowers 15 and 27 is also reduced, the power consumption of the battery 55 is also suppressed.

Further, even in FIG. 9, the controller 32 starts the battery+running motor waste heat recovery heating mode in Step S15, or starts the battery waste heat recovery heating mode in Step S16, and then proceeds to Step S17 to determine in the same manner as above whether or not the radiator 4 has achieved or lacks the heating capacity in the vehicle interior.

When the heating capacity in the vehicle interior is insufficient with the waste heat recovered from the battery 55 and the motor 65 for running (Qhp<TGQhp), the controller 32 proceeds from Step S17 to Step S18 to execute the waste heat recovery cooperative heating mode to be described later, or the waste heat recovery+auxiliary heater heating mode. Whether to execute the waste heat recovery cooperative heating mode or execute the waste heat recovery+auxiliary heater heating mode in these is determined in advance by setting, or there are taken those such as executing the waste heat recovery+auxiliary heater heating mode where it is known that the outdoor heat exchanger 7 is often frosted, executing the waste heat recovery cooperative heating mode in the case of a device not provided with the auxiliary heater 66, etc.

(8-2-2) Waste Feat Recovery Cooperative Heating Mode

Figure 13:
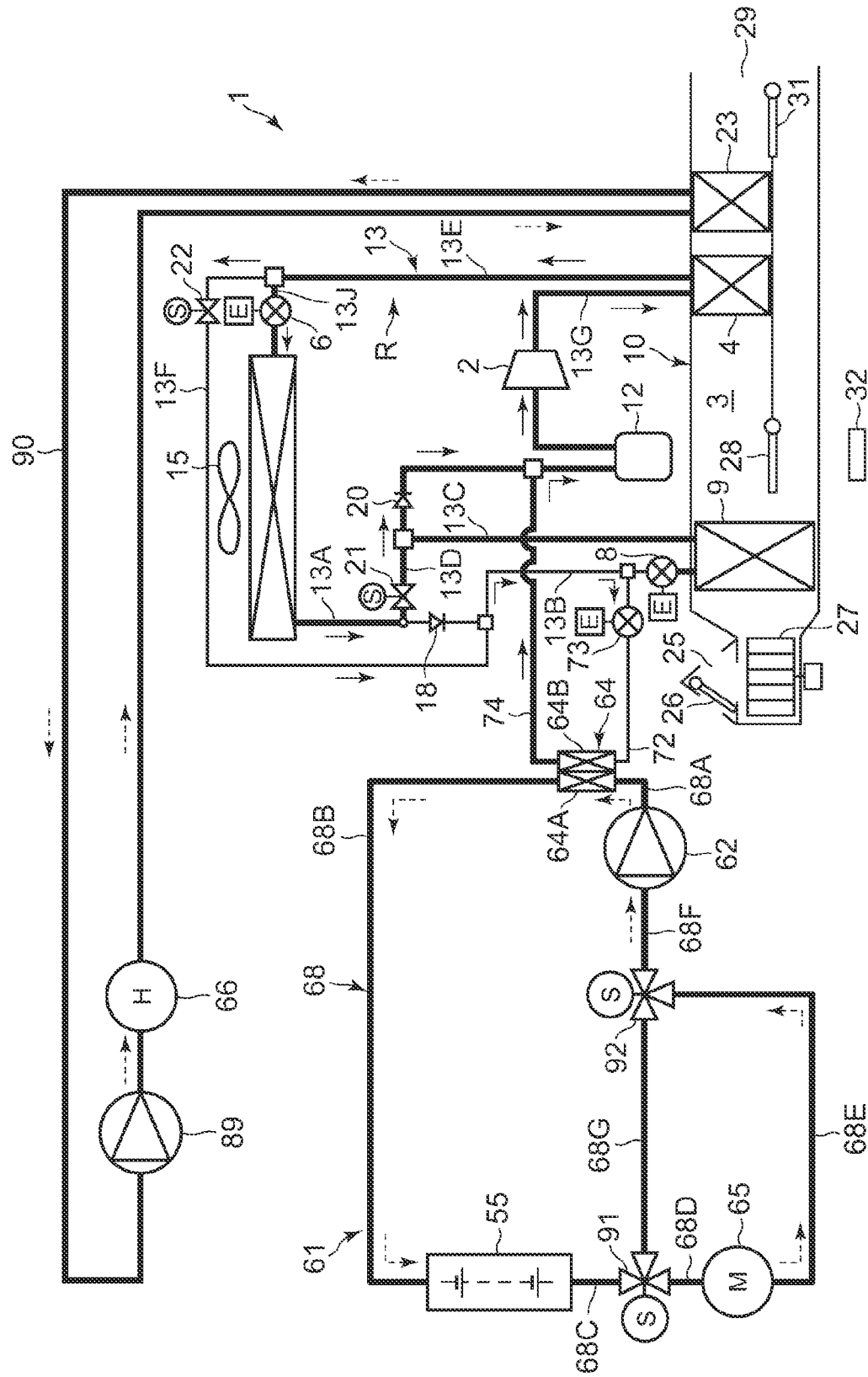
FIG. 13 is a diagram describing a waste heat recovery cooperative heating mode for the heating operation in the pre-air-conditioning by the controller of FIG. 2.

In the above waste heat recovery cooperative heating mode, the outdoor heat exchanger 7 absorbs heat from the outdoor air, and the waste heat of the battery 55 and the motor 65 for running is recovered and used for heating the vehicle interior in the radiator 4. FIG. 13 shows the flow (solid line arrows) of the refrigerant and the flow (broken line arrows) of the heat medium in the refrigerant circuit R in this waste heat recovery cooperative heating mode. In the waste heat recovery cooperative heating mode, the controller 32 opens the outdoor expansion valve 6 to put its valve position in a controlled state, and opens the solenoid valve 21. Further, the controller opens the solenoid valve 22 and also opens the auxiliary expansion valve 73 to put its valve position in a controlled state. Incidentally, the indoor expansion valve 8 is fully closed, and the auxiliary heater 66 is not energized.

Thus, the refrigerant discharged from the radiator 4 is distributed, and a part of the refrigerant flows to the outdoor expansion valve 6 and is decompressed, and then evaporates in the outdoor heat exchanger 7. At this time, the refrigerant absorbs heat from the outdoor air. The refrigerant evaporated from the outdoor heat exchanger 7 flows through the refrigerant pipe 13A, the solenoid valve 21, the refrigerant pipe 13D, the refrigerant pipe 13C, the check valve 20, and the accumulator 12 sequentially and is sucked into the compressor 2.

On the other hand, the other refrigerant that has been distributed flows into the solenoid valve 22, passes through the refrigerant pipe 13F, and reaches the refrigerant pipe 13B on the refrigerant upstream side of the indoor expansion valve 8. The refrigerant then enters the branch pipe 72, is decompressed the auxiliary expansion valve 73, and then flows into the refrigerant flow passage 64B of the waste heat recovering heat exchanger 64 through the branch pipe 72 to evaporate. At this time, it exerts a heat absorbing operation. A circulation is repeated in which the refrigerant evaporated in the refrigerant flow passage 64B flows through the refrigerant pipe 74, the refrigerant pipe 13C, and the accumulator 12 in sequence and is sucked into the compressor 2 (this is indicated by solid line arrows in FIG. 13).

On the other hand, for example, when the running motor temperature Tm is higher than or equal to the specified value, the controller 32 operates the second circulation pump 62 in a state in which the inlet and one outlet of the first three-way valve 91 are communicated with each other, and one inlet and the outlet of the second three-way valve 92 are communicated with each other Thus, a circulation is performed in which the heat medium discharged from the second circulation pump 62 flows in the heat medium pipe 68 in order of the heat medium flow passage 64A of the waste heat recovering heat exchanger 64, the battery 55, and the motor 65 for running and is sucked into the second circulation pump 62 (this is indicated by broken line arrows in FIG. 13).

Therefore, the heat medium heat-absorbed and cooled by the refrigerant in the heat medium flow passage 64A of the waste heat recovering heat exchanger 64 is circulated to the battery 55 and the motor 65 for running, and performs heat exchange with these battery 55 and motor 65 for running to recover the waste heat of the battery 55 and the motor 65 for running and to cool the battery 55 and the motor 65 for running. The waste heat recovered from the battery 55 and the motor 65 for running is pumped up by the waste heat recovering heat exchanger 64 into the refrigerant and used for heating of the vehicle interior in the radiator 4. Consequently, in this waste heat recovery cooperative heating mode, the vehicle interior is heated by the heat pumped up from the outdoor air by the outdoor heat exchanger 7, and the waste heat recovered from the battery 55 and the motor 65 for running.

In this case as well, the controller 32 lowers the target heater temperature TCO by a predetermined value as compared with the case of the heating operation in other than pre-air-conditioning as with the case of the aforementioned outdoor heat exchanger frosting suppression heating mode, and/or lowers the air volumes of the outdoor blower 15 and the indoor blower 27 by a predetermined value. Consequently, the outdoor heat exchanger 7 absorbs heat from the outdoor air without forming frost on the outdoor heat exchanger 7 or while reducing the frost formation as much as possible.

Thus, when the heating capacity by the radiator 4 is insufficient in the case where the controller 32 executes the pre-air-conditioning in the state in which the vehicle is not connected to the external power source, the controller executes the waste heat recovery cooperative heating mode to heat the vehicle interior. Consequently, the effective vehicle interior heating by the pre-air-conditioning can be achieved by utilizing the waste heat of the battery 55 and the motor 65 for running and without forming frost on the outdoor heat exchanger 7 or while preventing the outdoor heat exchanger 7 from being frosted as much as possible.

(8-2-3) Waste Heat Recovery+Auxiliary Heater Heating Mode

Figure 14:
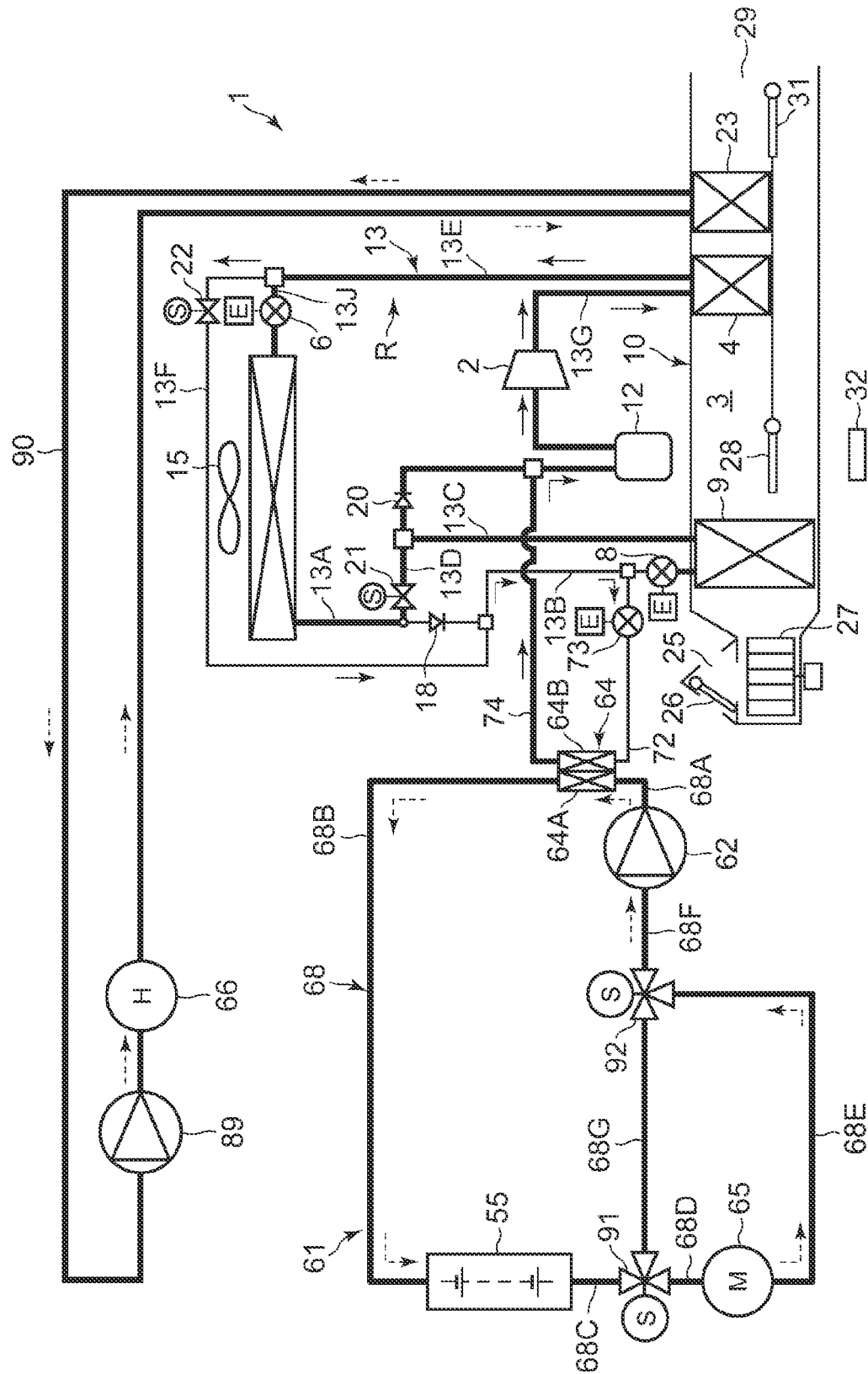
FIG. 14 is a diagram describing a waste heat recovery+ auxiliary heater heating mode for the heating operation in the pre-air-conditioning by the controller of FIG. 2.

Next, in the waste heat recovery+auxiliary heater heating mode, the waste heat of the battery 55 and the motor 65 for running is recovered and used for heating of the vehicle interior in the radiator 4, and the auxiliary heater 66 is caused to generate heat to heat the air supplied to the vehicle interior by the heater core 23. FIG. 14 shows the flow (solid line arrows) of the refrigerant and the flow (broken line arrows) of the heat medium in the refrigerant circuit R in this waste heat recovery+auxiliary heater heating mode.

In the waste heat recovery+auxiliary heater heating mode, the controller 32 fully closes the outdoor expansion valve 6 and closes the solenoid valve 21 to prevent the refrigerant from flowing into the outdoor heat exchanger 7. On the other hand, the solenoid valve 22 is opened, and the auxiliary expansion valve 73 is also opened to put its valve position in a controlled state, and the auxiliary heater 66 is energized to generate heat. Incidentally, the indoor expansion valve 8 is fully closed.

With this, all the refrigerant discharged from the radiator 4 flows to the solenoid valve 22, passes through the refrigerant pipe 13F, and reaches the refrigerant pipe 13B on the refrigerant upstream side of the indoor expansion valve 8. The refrigerant then enters the branch pipe 72, is decompressed by the auxiliary expansion valve 73, and then flows into the refrigerant flow passage 64B of the waste heat recovering heat exchanger 64 through the branch pipe 72 to evaporate. At this time, it exerts a heat absorbing operation. A circulation is repeated in which the refrigerant evaporated in the refrigerant flow passage 64B flows through the refrigerant pipe 74, the refrigerant pipe 13C, and the accumulator 12 in sequence and is sucked into the compressor 2 (this is indicated by solid line arrows in FIG. 14).

On the other hand, for example, when the running motor temperature Tm is also higher than or equal to the specified value, the controller 32 operates the second circulation pump 62 in the state in which the inlet and one outlet of the first three-way valve 91 are communicated with each other, and one inlet and the outlet of the second three-way valve 92 are communicated with each other. Thus, a circulation is performed in which the heat medium discharged from the second circulation pump 62 flows in the heat medium pipe 68 in order of the heat medium flow passage 64A of the waste heat recovering heat exchanger 64, the battery 55, and the motor 65 for running and is sucked into the second circulation pump 62 (this is indicated by broken line arrows in FIG. 14).

Therefore, the heat medium heat-absorbed and cooled by the refrigerant in the heat medium flow passage 64A of the waste heat recovering heat exchanger 64 is circulated to the battery 55 and the motor 65 for running and performs heat exchange with the battery 55 and the motor 65 for running to recover the waste heat of the battery 55 and the motor 65 for running and to cool the battery 55 and the motor 65 for running. The waste heat recovered from the battery 55 and the motor 65 for running is pumped up by the waste heat recovering heat exchanger 64 into the refrigerant and used for heating of the vehicle interior in the radiator 4.

On the other hand, the heat medium heated by the auxiliary heater 66 is circulated to the heater core 23, so that the air in the air flow passage 3 passing through the radiator 4 is heated by the heater core 23 and then supplied to the vehicle interior. Consequently, in this waste heat recovery+auxiliary heater heating mode, the vehicle interior is heated by the waste heat recovered from the battery 55 and the motor 65 for running and the heat generated by the heater core 23 (auxiliary heater 66).

Thus, when the heating capacity by the radiator is insufficient in the case where the pre-air-conditioning is performed in the state in which the vehicle is not connected to the external power source, the controller 32 executes the waste heat recovery+auxiliary heater heating mode to heat the vehicle interior. Consequently, when the heating capacity in the vehicle interior is insufficient only with the waste heat from the battery 55 and the motor 65 for running, the auxiliary heater 66 is caused to generate heat to thereby make it possible to heat the air in the air flow passage 3 by the heater core 23 and make up for the shortage. Thus, it becomes possible to eliminate frost formation on the outdoor heat exchanger 7 and achieve effective vehicle interior heating by the pre-air-conditioning while minimizing the power consumption of the auxiliary heater 66.

The controller 32 determines in Step S4 of FIG. 7 whether the pre-air-conditioning specified time has elapsed or has not elapsed. Then, when the pre-air-conditioning as described above is executed and the pre-air-conditioning specified time elapses in Step S4, the controller 32 proceeds to Step S5 to end the air conditioning operation.

The battery+running motor waste heat recovery heating mode (FIG. 10), the battery waste heat recovery heating mode (FIG. 11), the waste heat recovery cooperative heating mode (FIG. 13), and the waste heat recovery+auxiliary heater heating mode (FIG. 14) described in FIG. 9 may be executed not only during the heating operation in the pre-air-conditioning, but also during the normal heating operation (during running, etc.) other than the pre-air-conditioning. In that case, each mode may be changed in the same manner as in the control of FIG. 9, and the normal heating operation of (1) may be executed only when, for example, the battery temperature Tb is less than the specified value.

Also, in the embodiment, the heat medium heated by the auxiliary heater 66 is circulated to the heater core 23, but the present invention is not limited thereto, and the auxiliary heater 66 may be arranged in the air flow passage 3 on the air downstream side of the radiator 4. In that case, the heater core temperature sensor 78 detects the temperature of the auxiliary heater 66 and is used for control of the auxiliary heater 66.

Further, in the embodiment, the radiator 4 is arranged in the air flow passage 3, but the present invention is not limited thereto. There may be a type in which an air-heat medium heat exchanger is arranged in the air flow passage 3, and the heat medium heated by the radiator 4 is circulated in the air-heat medium heat exchanger to heat the vehicle interior.

In addition, the supply of power to the vehicle air-conditioning device 1 where the vehicle is connected to the external power source may be made via the battery 55 or may take the form of supplying power directly from the external power source to the vehicle air-conditioning device 1.

Moreover, in the embodiment, in the pre-air-conditioning heating operation, when the vehicle is connected to the external power source, the battery temperature Tb is first determined, and when the battery temperature Tb is less than the specified value, the auxiliary heater heating mode is executed (FIG. 8). When the vehicle is not connected thereto, the outdoor heat exchanger frosting suppression heating mode is executed (FIG. 9), but the present invention is not limited thereto. When both of the battery temperature Tb and the running motor temperature Tm are less than their specified values, the auxiliary heater heating mode (FIG. 8) may be executed, or the outdoor heat exchanger frosting suppression heating mode (FIG. 9) may be executed.

In addition, in the embodiment, the configuration of recovering the waste heat from the battery 55 (heat generating device) via the heat medium has been described, but the waste heat recovery heat exchanger that directly exchanges heat with the battery 55 may be provided to recover the waste heat with direct heat conduction from the battery 55 by the refrigerant.

Additionally, in the embodiment, the vehicle air-conditioning device that executes the dehumidifying and heating operation, the dehumidifying and cooling operation, and the cooling operation in addition to the heating operation has been taken up and described, but the present invention is not limited thereto. The present invention is also effective for a vehicle air-conditioning device that executes only the heating operation, or any of the above air conditioning operations in addition to the heating operation, or a combination thereof.

Furthermore, the configuration of the controller 32 described in the embodiment, and the configurations of the refrigerant circuit R and the waste heat recovering device 61 in the vehicle air-conditioning device 1 are not limited thereto, and needless to say, can be changed within the scope not departing from the gist of the present invention.

DESCRIPTION OF REFERENCE NUMERALS

1 vehicle air-conditioning device
2 compressor
4 radiator
6 outdoor expansion valve
7 outdoor heat exchanger
8 indoor expansion valve
9 heat absorber
13 refrigerant pipe
21, 22 solenoid valve
23 heater core
32 controller (control device)
53B remote controller
55 battery (heat generating device)
61 waste heat recovering device
62 second circulation pump
64 waste heat recovering heat exchanger
65 motor for running (heat generating device)
66 auxiliary heater
68 heat medium pipe
72 branch pipe
73 auxiliary expansion valve
74 refrigerant pipe
89 first circulation pump
91 first three-way valve
92 second three-way valve
R refrigerant circuit

The invention claimed is:

1. A vehicle-air conditioning device comprising:
a compressor to compress a refrigerant;
a radiator to let the refrigerant radiate heat, thereby heating air to be supplied to a vehicle interior;
an outdoor heat exchanger provided outside the vehicle interior;
a waste heat recovering heat exchanger to recover waste heat from a heat generating device mounted on a vehicle by using the refrigerant;
an auxiliary heater to heat the air supplied to the vehicle interior; and
a control device,
wherein the control device at least lets the refrigerant discharged from the compressor radiate heat in the radiator, causes decompression of the refrigerant from which the heat has been radiated, and then lets the refrigerant absorb heat in the outdoor heat exchanger to heat the vehicle interior,
wherein the control device is capable of executing pre-air-conditioning for preliminarily heating the vehicle interior before boarding,
wherein when the temperature of the heat generating device is higher than or equal to a predetermined specified value where the pre-air-conditioning is executed, the control device operates the compressor to let the refrigerant discharged from the compressor radiate heat in the radiator, causes decompression of the refrigerant from which the heat has been radiated, and then let the refrigerant absorb heat in the waste heat recovering heat exchanger without using the outdoor heat exchanger, thereby heating the vehicle interior, and
wherein when a heating capacity by the radiator is less than a target heating capacity where the control device executes the pre-air-conditioning in a state in which the vehicle is connected to an external power source, the control device causes the auxiliary heater to generate heat without operating the compressor, thereby heating the vehicle interior.

2. The vehicle air-conditioning device according to claim 1, including an auxiliary heater to heat the air supplied to the vehicle interior,
wherein when the temperature of the heat generating device is lower than the specified value where the control device executes the pre-air-conditioning in the state in which the vehicle is connected to the external power source, the control device causes the auxiliary heater to generate heat without operating the compressor, thereby heating the vehicle interior.

3. The vehicle air-conditioning device according to claim 1, including an auxiliary heater to heat the air supplied to the vehicle interior,
wherein when the heating capacity by the radiator is less than a target heating capacity where the control device executes the pre-air-conditioning in the state in which the vehicle is not connected to the external power source, the control device causes decompression of the refrigerant from which the heat has been radiated in the radiator and then lets the refrigerant absorb heat in the waste heat recovering heat exchanger, and causes the auxiliary heater to generate heat, thereby heating the vehicle interior.

4. The vehicle air-conditioning device according to claim 1, wherein when the heating capacity by the radiator is less than a target heating capacity where the control device executes the pre-air-conditioning in the state in which the vehicle is not connected to the external power source, the control device causes decompression of the refrigerant from which the heat has been radiated in the radiator and then lets the refrigerant absorb heat in the outdoor heat exchanger and the waste heat recovering heat exchanger, thereby heating the vehicle interior.

5. The vehicle air-conditioning device according to claim 1, wherein when the temperature of the heat generating device is lower than the specified value where the control device executes the pre-air-conditioning in the state in which the vehicle is not connected to the external power source, the control device causes decompression of the refrigerant from which the heat has been radiated in the radiator, and then lets the refrigerant absorb heat in the outdoor heat exchanger, thereby heating the vehicle interior.

6. The vehicle air-conditioning device according to claim 1, wherein the heat generating device includes at least a battery which can be charged by the external power source, and is operated by being supplied with power from the battery.

7. The vehicle air-conditioning device according to claim 1, including an air inlet changing damper to change the air supplied to the vehicle interior between indoor air circulating and outdoor air introducing,
wherein when the pre-air-conditioning is executed, the control device changes the air inlet changing damper to the indoor air circulating.

8. A vehicle-air conditioning device comprising:
a compressor to compress a refrigerant;
a radiator to let the refrigerant radiate heat, thereby heating air to be supplied to a vehicle interior;
an outdoor heat exchanger provided outside the vehicle interior;
a waste heat recovering heat exchanger to recover waste heat from a heat generating device mounted on a vehicle by using the refrigerant;
an auxiliary heater to heat the air supplied to the vehicle interior; and
a control device,
wherein the control device at least lets the refrigerant discharged from the compressor radiate heat in the radiator, causes decompression of the refrigerant from which the heat has been radiated, and then lets the refrigerant absorb heat in the outdoor heat exchanger to heat the vehicle interior,
wherein the control device is capable of executing pre-air-conditioning for preliminarily heating the vehicle interior before boarding,
wherein when the temperature of the heat generating device is higher than or equal to a predetermined specified value where the pre-air-conditioning is executed, the control device operates the compressor to let the refrigerant discharged from the compressor radiate heat in the radiator, causes decompression of the refrigerant from which the heat has been radiated, and then let the refrigerant absorb heat in the waste heat recovering heat exchanger without using the outdoor heat exchanger, thereby heating the vehicle interior, and
wherein when the temperature of the heat generating device is lower than the specified value where the control device executes the pre-air-conditioning in the state in which the vehicle is connected to the external power source, the control device causes the auxiliary heater to generate heat without operating the compressor, thereby heating the vehicle interior.

9. The vehicle air-conditioning device according to claim 8, including an auxiliary heater to heat the air supplied to the vehicle interior,
wherein when the heating capacity by the radiator is less than a target heating capacity where the control device executes the pre-air-conditioning in the state in which the vehicle is not connected to the external power source, the control device causes decompression of the refrigerant from which the heat has been radiated in the radiator and then lets the refrigerant absorb heat in the waste heat recovering heat exchanger, and causes the auxiliary heater to generate heat, thereby heating the vehicle interior.

10. A vehicle-air conditioning device comprising:
a compressor to compress a refrigerant;
a radiator to let the refrigerant radiate heat, thereby heating air to be supplied to a vehicle interior;
an outdoor heat exchanger provided outside the vehicle interior;
a waste heat recovering heat exchanger to recover waste heat from a heat generating device mounted on a vehicle by using the refrigerant;
an auxiliary heater to heat the air supplied to the vehicle interior; and
a control device,
wherein the control device at least lets the refrigerant discharged from the compressor radiate heat in the radiator, causes decompression of the refrigerant from which the heat has been radiated, and then lets the refrigerant absorb heat in the outdoor heat exchanger to heat the vehicle interior,
wherein the control device is capable of executing pre-air-conditioning for preliminarily heating the vehicle interior before boarding,
wherein when the temperature of the heat generating device is higher than or equal to a predetermined specified value where the pre-air-conditioning is executed, the control device operates the compressor to let the refrigerant discharged from the compressor radiate heat in the radiator, causes decompression of the refrigerant from which the heat has been radiated, and then let the refrigerant absorb heat in the waste heat recovering heat exchanger without using the outdoor heat exchanger, thereby heating the vehicle interior, and
wherein when the heating capacity by the radiator is less than a target heating capacity where the control device executes the pre-air-conditioning in the state in which the vehicle is not connected to the external power source, the control device causes decompression of the refrigerant from which the heat has been radiated in the radiator and then lets the refrigerant absorb heat in the waste heat recovering heat exchanger, and causes the auxiliary heater to generate heat, thereby heating the vehicle interior.

11. A vehicle-air conditioning device comprising:
a compressor to compress a refrigerant;
a radiator to let the refrigerant radiate heat, thereby heating air to be supplied to a vehicle interior;
an outdoor heat exchanger provided outside the vehicle interior;
a waste heat recovering heat exchanger to recover waste heat from a heat generating device mounted on a vehicle by using the refrigerant;
an auxiliary heater to heat the air supplied to the vehicle interior; and
a control device,
wherein the control device at least lets the refrigerant discharged from the compressor radiate heat in the radiator, causes decompression of the refrigerant from which the heat has been radiated, and then lets the refrigerant absorb heat in the outdoor heat exchanger to heat the vehicle interior,
wherein the control device is capable of executing pre-air-conditioning for preliminarily heating the vehicle interior before boarding,
wherein when the temperature of the heat generating device is higher than or equal to a predetermined specified value where the pre-air-conditioning is executed, the control device operates the compressor to let the refrigerant discharged from the compressor radiate heat in the radiator, causes decompression of the refrigerant from which the heat has been radiated, and then let the refrigerant absorb heat in the waste heat recovering heat exchanger without using the outdoor heat exchanger, thereby heating the vehicle interior, and wherein when the heating capacity by the radiator is less than a target heating capacity where the control device executes the pre-air-conditioning in the state in which the vehicle is not connected to the external power source, the control device causes decompression of the refrigerant from which the heat has been radiated in the radiator and then lets the refrigerant absorb heat in the outdoor heat exchanger and the waste heat recovering heat exchanger, thereby heating the vehicle interior.

12. The vehicle air-conditioning device according to claim 11, wherein the control device performs heating of the vehicle interior in a range in which the outdoor heat exchanger is not frosted.

13. The vehicle air-conditioning device according to claim 12, wherein the heat generating device includes at least a battery which can be charged by the external power source, and is operated by being supplied with power from the battery.

14. The vehicle air-conditioning device according to claim 11, wherein when the temperature of the heat generating device is lower than the specified value where the control device executes the pre-air-conditioning in the state in which the vehicle is not connected to the external power source, the control device causes decompression of the refrigerant from which the heat has been radiated in the radiator, and then lets the refrigerant absorb heat in the outdoor heat exchanger, thereby heating the vehicle interior.

* * * * *